US008775352B2

(12) United States Patent
Sen et al.

(10) Patent No.: US 8,775,352 B2
(45) Date of Patent: Jul. 8, 2014

(54) METHODS AND APPARATUS TO MODEL END-TO-END CLASS OF SERVICE POLICIES IN NETWORKS

(75) Inventors: Subhabrata Sen, New Providence, NJ (US); Carsten Lund, Berkeley Hts., NJ (US); Sanjay Gopinatha Rao, West Lafayette, IN (US); Yu-Wei Sung, West Lafayette, IN (US)

(73) Assignees: AT&T Intellectual Property I, L.P., Atlanta, GA (US); Purdue Research Foundation, West Lafayette, IN (US)

( * ) Notice: Subject to any disclaimer, the term of this patent is extended or adjusted under 35 U.S.C. 154(b) by 1069 days.

(21) Appl. No.: 12/715,189

(22) Filed: Mar. 1, 2010

(65) Prior Publication Data

US 2011/0213738 A1    Sep. 1, 2011

(51) Int. Cl.
*G06F 17/00*      (2006.01)
*G06N 5/02*       (2006.01)

(52) U.S. Cl.
USPC ........................................................... 706/47

(58) Field of Classification Search
None
See application file for complete search history.

(56) References Cited

U.S. PATENT DOCUMENTS

| 6,944,183 | B1 | 9/2005 | Iyer et al. |
| 7,453,886 | B1 | 11/2008 | Allan |
| 7,551,925 | B2 | 6/2009 | Simongini et al. |
| 8,160,092 | B1 * | 4/2012 | Attig et al. ................... 370/458 |
| 2004/0213264 | A1 | 10/2004 | Mistry et al. |
| 2008/0021795 | A1 * | 1/2008 | Hungar et al. ................. 705/27 |

OTHER PUBLICATIONS

Sung et al. "Modeling and Understanding End-to-End Class of Service Policies in Operational Networks", SIGCOMM'09, 2009, pp. 12.*
Al-Shaer et al. "Network Configuration in a Box: Towards End-to-End Verification of Network Reachability and Security", IEEE, 2009, pp. 123-132.*
Yuan et al. "Fireman: A Toolkit for FIREwall Modeling and Analysis", Proc. IEEE Symposium on SP, 2006, pp. 12.*
Sun et al., "A Systematic Approach for Evolving VLAN Designs," IEEE INFOCOM, 2010, 9 pages.
Sung et al., "Extracting Network-wide Correlated Changes from Longitudinal Configuration Data," Proceedings of Passived and Active Measurement Conference, Seoul, Korea, Apr. 2009, 10 pages.
Sung et al., "Towards Automated Auditing for Network Configuration Changes," Poster Abstract in ACM SIGCOMM, Seattle, WA, Aug. 17-22, 2008, 2 pages.
Garimella et al., "Characterizing VLAN usage in an Operational Network," Electrical and Computer Engineering ECE Technical Reports, Purdue Libraries, Aug. 2007, 8 pages.
Garimella et al., "Characterizing VLAN usage in an Operational Network," ACM SIGCOMM workshop on Internet Netowrk Management (INM), Aug. 27-31, 2007, Kyoto, Japan, 2 pages.

(Continued)

*Primary Examiner* — Li-Wu Chang
(74) *Attorney, Agent, or Firm* — Hanley, Flight & Zimmerman, LLC

(57) ABSTRACT

Methods and apparatus to model end-to-end class of service policies in operational networks are disclosed. An example method to generate a class of service model is described, including electronically generating a ruleset based on the class of service configuration associated with a router, electronically generating a flat representation of the ruleset, electronically generating a class of service model by composing the flat representation into a composed ruleset, and storing the class of service model in a computer-readable memory.

14 Claims, 15 Drawing Sheets

(56) References Cited

OTHER PUBLICATIONS

Sung et al., "Modeling and Understanding End-to-End Class of Service Policies in Operational Networks," SIGCOMM 09, Aug. 17-21, 2009, Barcelona, Spain, 12 pages.
Enck et al., "Configuration Management at Massive Scale: System Design and Experience," IEEE Journal on Selected Areas in Communications, vol. 27, No. 3, Apr. 2009, 13 pages.
Sung et al., "Towards Systematic Design of Enterprise Networks," Technical Report TR-ECE-08-07m Purdue University, Aug. 2008, 12 pages.
Benson et al., "Unraveling the Complexity of Network Management," 2009, 14 pages.
Le et al., "Minerals: Using Data Mining to Detect Router Misconfigurations," SIGCOMM 06 Workshops, Sep. 11-15, 2006, Pisa, Italy, 6 pages.
"Cisco IP Solution Center 5.2," Cisco Systems, Inc., 2009, 6 pages.
IP Solution Center—MPLS VPN, "Deploying MPLS VPN Services," Cisco Systems, Inc., copyright 1992-2003, 15 pages.
Broadband Forum Technical Report, "TR-069, CPE WAN Management Protocol v1.1," Issue 1, Amendment 1, Nov. 2006, 131 pages.
Broadband Forum Technical Report, "TR-069, CPE WAN Management Protocol v1.1," Issue 1, Amendment 2, Dec. 2007, 138 pages.
Intelliden, "Products: Policy Based Compliance Management," retrieved from http://www.intelliden.com/products-network_compliance.html, on Oct. 19, 2009, 2 pages.
HP Data Center Automation Center, BTO Software, retrieved from https://h10078.www1.hp.com/cda/hpms/display/main/hpms_content.jsp?. . . , on Oct. 19, 2009, 1 page.
Voyence—Network Engineers and Administrators, "Solutions by Business Role," retrieved from http://www.voyence.com/solutions/business-netadmins.shtml, on Oct. 19, 2009, 2 pages.
Roxen Community, "Routing Policy Specification Language (RPSL)," dated Jun. 1999, retrieved from http://community.roxen.com/developers/idocs/rfc/rfc2622.html, on Oct. 26, 2009, 44 pages.
Benson et al., "Unraveling the Complexity of Network Management," NSDI, 2009, 14 pages.
Bohm et al., "Network-Wide Inter-Domain Routing Policies: Design and Realization," Apr. 2005, 15 pages.
Case et al., "A Simple Network Management Protocol (SNMP)," Network Woeking Group, retrieved from http://www.ietf.org/rfc/rfc1157.txt, on Oct. 19, 2009, 32 pages.
CiscoWorks, "Small Network Management Solution," Version 1.5, Cisco Systems, Inc., copyright 1992-2003, 7 pages.
Enck et al., "Configuration Management at Massive Scale: System Design and Experience," USENIX Association, 2007 USENIX Annual Technical Conference, 14 pages.
Feamster et al., "Detecting BGP Configuration Faults with Static Analysis," MIT Computer Science and Artificial Intelligence Laboratory, May 2005, 15 pages.
Feldmann et al., "IP Network Configuration for Intradomain Traffic Engineering," IEEE network magazine, Sep. 2001, 27 pages.
Hamed et al., "Modeling and Verification of IPSec and VPN Security Policies," IEEE ICNP, 2005, 10 pages.
Le et al., "Shedding Light on the Glue Logic of the Internet Routing Architecture," SIGCOMM 08, Aug. 17-22, 2008, Seattle, Wa, USA, 12 pp.
Maltz et al., "Routing Design in Operational Networks: A Look from the Inside," SIGCOMM 04, Aug. 30-Sep. 4, 2004, Portland, OR, USA, 14 pages.
Narain, "Network Configuration Management via Model Finding," 19th Large Installation System Administration Conference (LISA 05), 14 pages.
Xie et al., "On Static Reachability Analysis of IP Networks," Proc. IEEE INFOCOM, Mar. 2005, 14 pages.
Yuan et al., "ProgME: Towards Programmable Network MEasurement," SIGCOMM 07, Aug. 27-31, 2007, Kyoto, Japan, 12 pages.
Yuan et al., "Fireman: A Toolkit for FIREwall Modeling and ANalysis," IEEE Symposium on Security and Privacy, 2006, 15 pages.
Al-Shaer et al., "Discovery of Policy Anomalies in Distributed Firewalls," IEEE Explore, 2004, 12 pages.
Hazelhurst et al., "Algorithms for Improving the Dependability of Firewall and Filter Rule Lists," IEEE Xplore, 2000, 10 pages.
Sanjay, "Data Sharing and Repositories to Support Research," ECE Department, Purdue University, in Microsoft Edgenet 2006, 14 pages.
Sung et al., "Case for Task-Driven Network-Wide Abstraction approach to Enterprise Design," ECE Department, Purdue University, in Configuration Workshop, Lisa 2007, 11 pages.
Polvi, "LISA '06: 20th Large Installation System Administration Conference Reports," Washington,D.C. Dec. 3-8, 2006, 32 pages.
Hinman, "Fundamentals of Mathematical Logic," A K Peters LTD, 2005, 878 pages.
Distributed Management Task Force, Inc. http://www.dmtf.org, 6 pages, 2010.
Internet Systems Lab (ISL), Purdue University, http://cobweb.ecn.purdue.edu/~isl/netmgmt.htm, Oct. 20, 2007, 3 pages.

\* cited by examiner

400

```
1    class-map match-any REALTIME
2        match access-group VOICE
3        match access-group INTERACTIVE-VIDEO
4        match ip dscp 46
5    class-map match-all ...    ! OTHER class-map DEFINITIONS
6    !
7    policy-map REALTIME-POLICER
8        class REALTIME
9            police 300000 conform-action set-dscp-transmit 46
                    exceed-action drop
10   policy-map CRITICAL-DATA-POLICER
11       class ROUTING
12           set ip dscp 48
13       class OTHER-CRITICAL-DATA
14           police 150000 conform-action set-dscp-transmit 26
                    exceed-action set-dscp-transmit 28
15   policy-map BEST-EFFORT-MARKER
16       ...
17   !
18   policy-map WAN-EGRESS-POLICER-QUEUE
19       class REALTIME
20           priority percent 35
21           service-policy REALTIME-POLICER
22       class CRITICAL-DATA
23           ...
24           service-policy CRITICAL-DATA-POLICER
25       class class-default
26           ...
27           service-policy BEST-EFFORT-MARKER
28   !
29   interface Ethernet0/1    ! INTERFACE TO LA BRANCH's LAN
30       ...                  ! LAN INGRESS MARKING POLICY
31   !
32   interface Serial1/0      ! INTERFACE TO PER1
33       service-policy output WAN-EGRESS-POLICER-QUEUE
34   !
35   ip access-list extended VOICE
36       permit ip 192.168.1.0 0.0.0.255 any
37       permit ip any 192.168.1.0 0.0.0.255
38   ip access-list ...       ! ACLs FOR OTHER TYPES OF TRAFFIC
```

```
1    class-map match-any REALTIME
2        match ip dscp 46
3    class-map match-any CRITICAL-DATA
4        match ip dscp 48
5        match ip dscp 26
6        match ip dscp 28
7    !
8    policy-map WAN-INGRESS-MARKING
9        class REALTIME
10           police 1050000 conform-action set-mpls-exp-transmit 5
                 exceed-action drop
11       class CRITICAL-DATA
12           police 600000 conform-action set-mpls-exp-transmit 3
                 exceed-action set-mpls-exp-transmit 7
13       class class-default
14           police 750000 conform-action set-mpls-exp-transmit 0
                 exceed-action set-mpls-exp-transmit 4
15   !
16   interface Serial1/0 ! INTERFACE TO CER1
17       service-policy input WAN-INGRESS-MARKING
18       service-policy output WAN-EGRESS-QUEUE ! QUEUE TO LA
19   !
```

FIG. 6

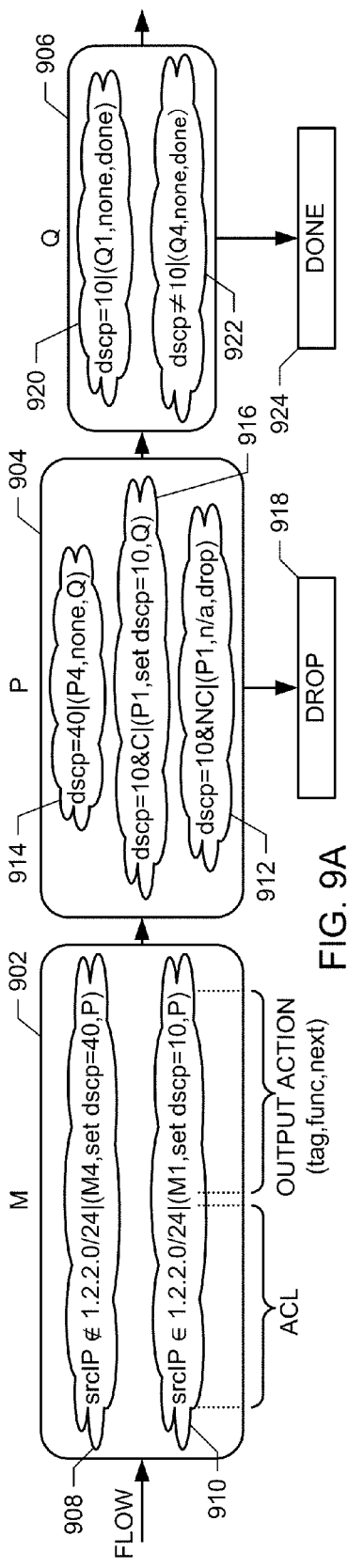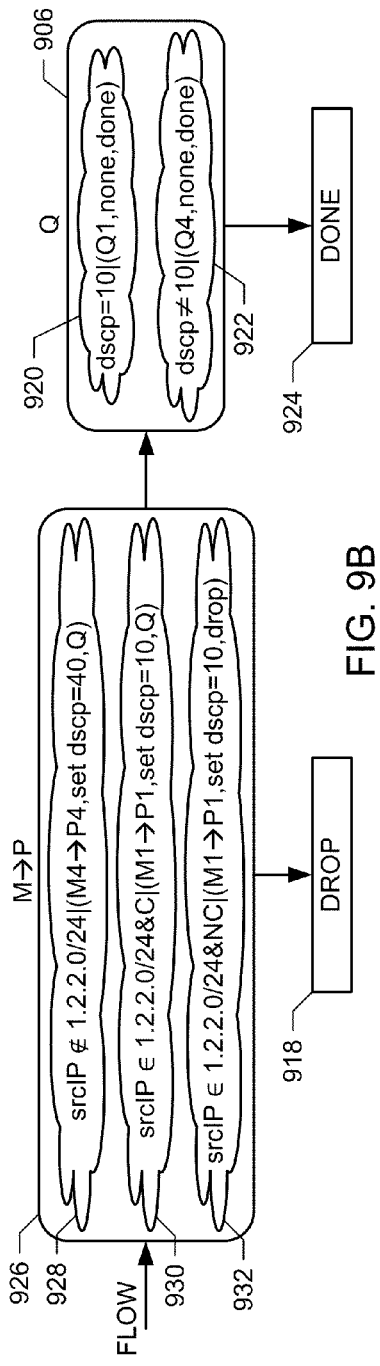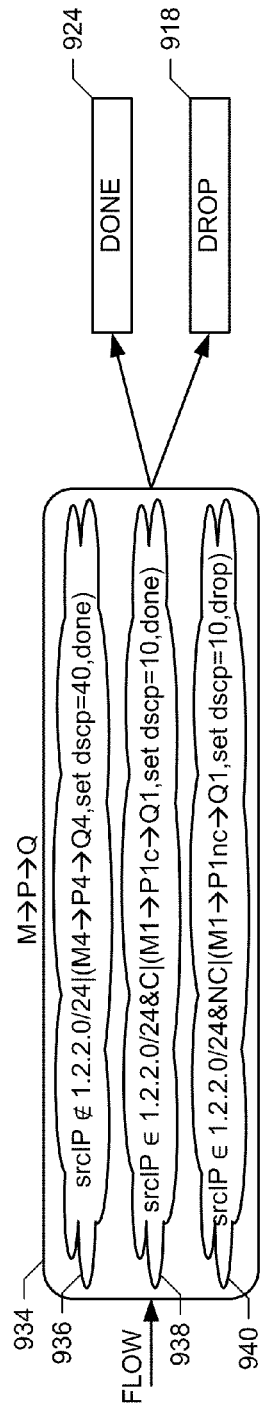
FIG. 9A
FIG. 9B
FIG. 9C

METHODS AND APPARATUS TO MODEL END-TO-END CLASS OF SERVICE POLICIES IN NETWORKS

STATEMENT REGARDING FEDERALLY SPONSORED RESEARCH OR DEVELOPMENT

This invention was made with government support under Grant No. 0721488 awarded by the National Science Foundation. The government has certain rights in the invention.

FIELD OF THE DISCLOSURE

This disclosure relates generally to networks and, more particularly, to methods and apparatus to model end-to-end class of service policies in networks.

BACKGROUND

Enterprise networks are increasingly moving from using dedicated private lines to using virtual private networks (VPNs) and, more particularly, using network layer Multi-Protocol Label Switching (MPLS) to connect geographically disparate sites. In an MPLS network architecture, each network site has one or more customer edge routers (CERs), which may be jointly configured by the customer and/or a service provider that provides network service between the CERs. Each CER connects to one or more provider edge routers (PERs) in the network. Internet protocol (IP) traffic from a CER that originates from or is destined for the customer is encapsulated by MPLS labels at the ingress PER, carried over MPLS tunnels across routers in an MPLS backbone network, decapsulated by a remote PER, and sent to the appropriate destination CER. Such provider-based VPNs provide a scalable and secure way for a service provider to support VPN services for many different customers using a common MPLS backbone network.

BRIEF DESCRIPTION OF THE DRAWINGS

FIG. 4 illustrates example pseudocode that may be used to implement a class of service configuration file in a customer edge router.

FIG. 6 illustrates example pseudocode that may be used to implement a class of service configuration file in a provider edge router.

FIGS. 9A, 9B, and 9C illustrate an example composition of multiple rulesets.

DETAILED DESCRIPTION

Figure 1:
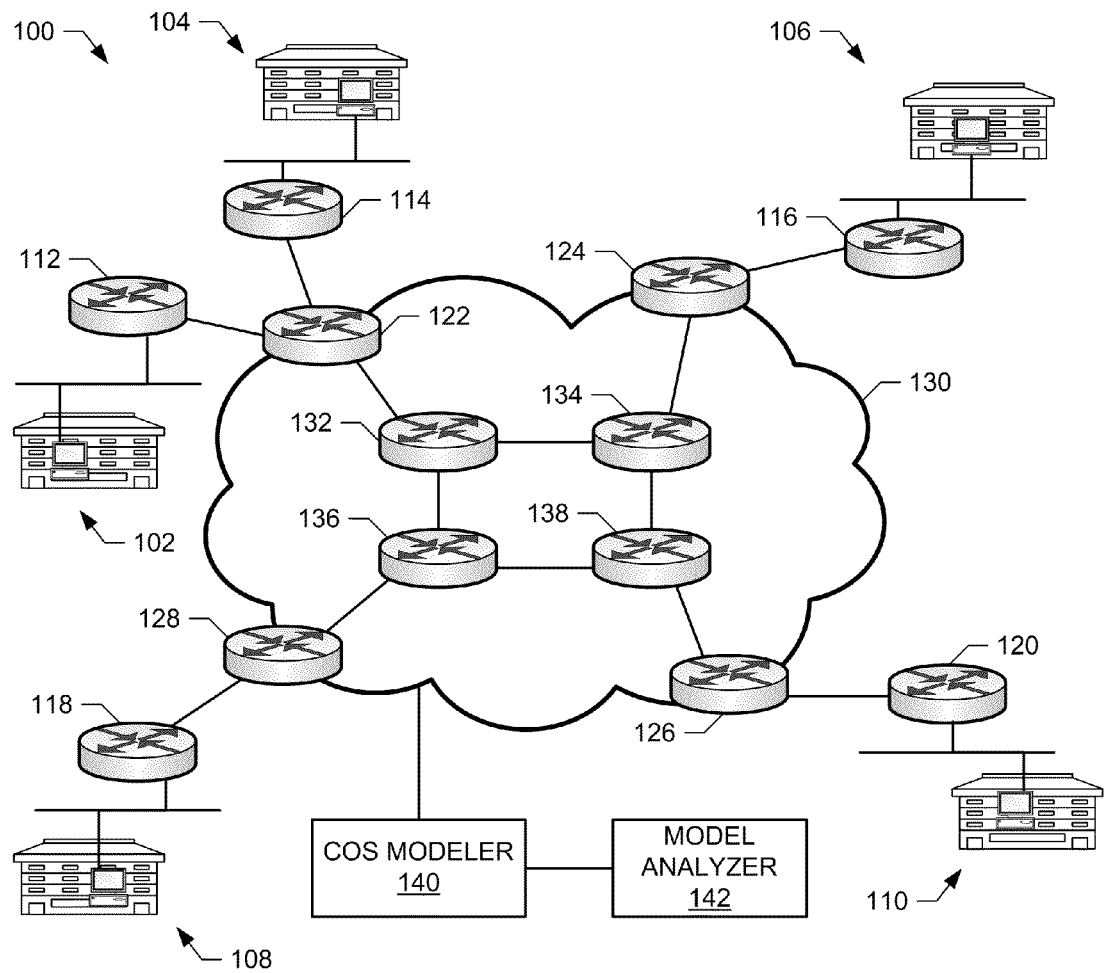
FIG. 1 illustrates an example enterprise virtual private network spanning multiple geographically disparate sites.

Certain examples are shown in the above-identified figures and described in detail below. In describing these examples, like or identical reference numbers may be used to identify similar elements. The figures are not necessarily to scale and certain features and certain views of the figures may be shown exaggerated in scale or in schematic for clarity and/or conciseness. Although the following discloses example methods, apparatus, and articles of manufacture, it should be noted that such methods, apparatus, and articles of manufacture are merely illustrative and should not be considered as limiting. Accordingly, while the following describes example methods, apparatus, and articles of manufacture, the examples are not the only way to implement such methods, apparatus, and articles of manufacture.

A consideration for service providers in designing enterprise (e.g., customer) virtual private networks (VPNs) is to satisfy different application needs such as delay, jitter, and bandwidth. In an enterprise VPN architecture, both the enterprise and the service provider support traffic for different applications, different performance requirements, and/or different service priorities over the same network infrastructure. Additionally, in the service provider backbone network, services with different requirements such as VPNs, Internet, multicast, and Voice over Internet protocol (VoIP) may coexist. The service provider backbone network includes provider edge routers (PERs), which may interface with customers using Customer Edge Routers (CERs).

At the edge of the backbone network, also referred herein to as a service provider network or MPLS backbone network, and between the enterprise and the service provider, bandwidth should be carefully managed across different competing applications. For example, the edge and/or the backbone network may have limited available bandwidth capacity. Further, provisioning additional capacity is expensive. Even when the backbone network is overprovisioned, bandwidth should still be carefully managed to address different failure scenarios.

Upon agreeing to provide network service, a service provider enters into a service level agreement (SLA) with an enterprise. The SLA describes the agreed-to requirements on performance for different applications used by the enterprise. The network performance requirements for the enterprise applications are based on the requirements of the applications, the relative priorities of applications used by that enterprise, and cost. The components (e.g., routers) used to administer the VPN are then configured appropriately to honor the SLAs. Violations of the SLAs are costly to both the enterprise and the service provider, may cause significant disruption of enterprise activity, and/or may result in penalties (e.g., monetary or other) for the service provider. Thus, violations are to be avoided.

Service differentiation (e.g., treating data with different priorities based on their application) is an aspect of managing traffic in a heterogeneous network (e.g., a network that supports different enterprise VPNs). Implementing a Class of Service (CoS) policy in a network is an example method to realize service differentiation in a backbone network supporting an enterprise VPN. Applying a CoS policy includes grouping traffic having similar or identical service requirements (e.g., real-time, critical data, bulk data, best effort, etc.), and treating each type as a class with its own level of service priority. The typical Internet protocol (IP) header found at the beginning of each IP packet in an IP network includes six fields: source and destination IP addresses, source and destination ports, protocol, and Type of Service (ToS). The ToS field of the IP header of each packet indicates the priority class to which it belongs.

In IP headers, the first six bits of the ToS field includes the class information, and these six bits are referred to as the Differentiated Services Code Point (DSCP) bits. The DSCP bits are used by CERs and PERs in deciding the treatment that a packet should receive on CER-PER and PER-CER links. Before sending a packet out to the backbone network, a PER encapsulates each IP packet with an Multi Packet Label Switching (MPLS) label and maps the DSCP value of the packet to a 3-bit field in the MPLS label referred to as the experimental (EXP) value. The EXP value is used by routers in the backbone network to treat traffic differentially in the service provider network core.

CoS designs are very dynamic, and may need to be refined over time to reflect the evolving nature of enterprise traffic requirements, the emergence of new applications, and/or shifts in traffic patterns (e.g., migration of a database server to another site). For example, the numbers and types of classes configured for each site and the CoS parameters for those classes may change, which necessitates changes to the CoS configuration. Errors in changing the CoS configurations could impact service quality, and lead to service provider violations of one or more SLAs.

To maintain and/or repair service, network operators may troubleshoot performance problems. In some examples described below, when troubleshooting configurations in response to a customer complaint about poor performance, operators may trace how a set of flows are marked, policed and queued in terms of service class across different routers in the end-end path. An example of incorrect configuration includes misconfiguring real-time traffic to go into a queue corresponding to traffic of a lower priority class. Manually tracing configurations (e.g., via a network technician) to detect such problems is challenging.

Some example methods and apparatus described herein present network operators with visualizations of network-wide CoS designs or configurations employed in different CER sites and/or traffic classes that can be exchanged between CER sites. Visualization is very helpful to network operators, because CoS designs often have significant differences across enterprises and there may be significant variations in policies used within routers in a given enterprise. The time required for a network operator to understand the network policies of an enterprise via manual tracing is large.

In some examples described herein, operators may easily trace or view the possible ways in which traffic can be treated within a router, and across multiple routers. Rapid tracing of traffic can help operators detect router configurations that treat flows in potentially anomalous ways or indicate the presence of shadowed policies in the configuration as described in more detail below.

Some examples described below include generating a formal representation of the CoS policies. These formal representations capture the policy goals (preferably in a precise and unambiguous manner), and are also independent of low-level configuration syntax. In some examples, a formal representation of CoS policy is derivable from low-level configurations through a simple parser. Additionally or alternatively, the representation is amenable to composition (i.e., it should be possible to compose different formal representations corresponding to different CoS policies expressed across different stages of a router and/or across multiple routers to obtain network-wide views of the design).

In some examples, a CoS modeler generates a model of a CoS policy that takes a multi-dimensional input and produces an output. To generate the model, the CoS modeler receives one or more router configuration files that define the CoS policies for the respective routers. Some example router configuration files include access control lists (ACLs) that define how packets should be assigned a class of service, and how the classes are treated by the router. The model may initially be based upon one or more recursive rulesets. A ruleset may depend on another ruleset. In some examples, to increase computational efficiency, the CoS modeler flattens the rulesets from the recursive representation to a flat representation. Additionally or alternatively, in some examples the CoS modeler composes rulesets from multiple routers into an overall CoS policy. The overall CoS policy may reflect packet transfer management rules between multiple networks.

In some examples, a flow analyzer uses the CoS model to analyze the CoS treatment of flows in an enterprise VPN network. Some example inputs to the flow analyzer include a flowset, or a set of flows, identified by the IP header fields (i.e., source and destination IP addresses, source and destination port numbers, IP protocol, and ToS byte). Additionally or alternatively, the flow analyzer accepts other inputs that may model attributes outside the scope of a static analysis. For example, the router may treat packets differently depending on whether they are conformant or nonconformant. Some example inputs model packet conformity, or lack thereof, by having an additional bit in the input that specifies whether the model should treat the packets in a flow as conformant. In some examples, the output provides information about the path taken by a packet corresponding to the flow (e.g., which queue would be used by the packet), how the packet gets changed (e.g., how the routers modify the ToS byte of the packet), and where the packet ends up (e.g., does the packet get dropped by a policer if nonconformant).

FIG. 1 illustrates an example enterprise VPN 100 spanning multiple geographically disparate sites 102, 104, 106, 108, and 110. The example sites 102-110 each have one or more customer edge routers (CERs) 112, 114, 116, 118, and 120, which can be jointly configured by the enterprise and a service provider. Each CER connects to one or more provider edge routers (PER) 122, 124, 126, and 128 in a service provider network 130.

Enterprise IP traffic from a CER (e.g., 112) is encapsulated by MPLS labels at the ingress PER (e.g., 122), carried over MPLS tunnels across core routers 132, 134, 136, and/or 138 in the service provider network 130, decapsulated by a remote PER (e.g., 128), and sent to the appropriate destination CER (e.g., 120). Such provider-based VPNs provide a scalable and secure way for a service provider to support many different customers across the common service provider network 130.

To differentiate traffic in the network 130 and provide higher classes of service to higher-priority enterprise traffic, the CERs 112-120, the PERs 122-128, and/or the core routers 130-138 support one or more CoS policies. The CoS polic(ies) determine, for example, the type of a packet and the priority that the packet should be given when being transported through the network 130. The CoS polic(ies) are implemented at the CERs 112-120, the PERs 122-128, and/or the core routers 130-148 via respective router configuration files (not shown). The configuration files may be different for each of the CERs 112-120, the PERs 122-128, and/or the core routers 130-148, because traffic patterns at each of the sites 102-110 may be different.

The example VPN 100 further includes a CoS modeler 140 and a flow analyzer 142. The example CoS modeler 140 receives the CoS configuration files corresponding to CERs 112-120 and/or PERs 122-128 (collectively, "edge routers" 112-128) that a network operator may want to model (e.g., troubleshoot). Based on the CoS configuration files, the CoS modeler generates a ruleset, flattens the ruleset, and composes rulesets for the edge routers 112-128. Based on the model generated by the CoS modeler 140, the flow analyzer 142 may receive one or more flows, which may be represented by ACLs, and determine the end-to-end treatment of the flows through the network. The CoS modeler 140 and the flow analyzer 142 are described in more detail below.

Figure 2:
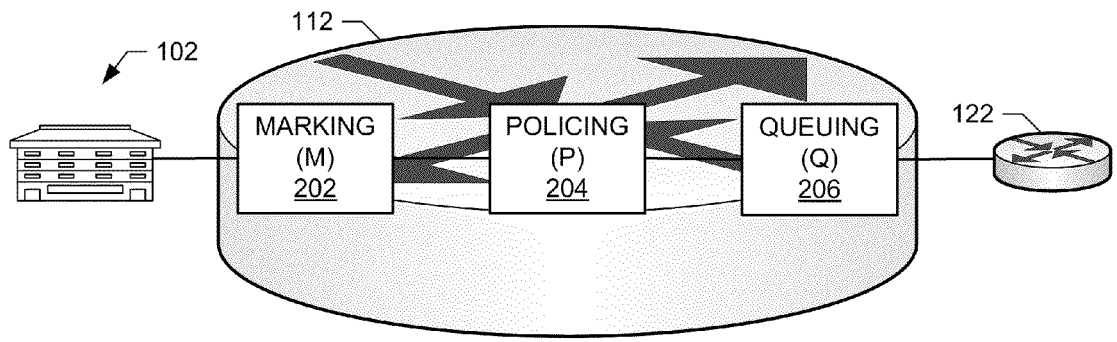
FIG. 2 is a more detailed block diagram of an example customer edge router used to implement the network of FIG. 1.

FIG. 2 is a more detailed block diagram of an example customer edge router 112 used to implement the VPN 100 of FIG. 1. In general the CER 112 of FIG. 2 includes three main components: a marker 202, policer 204, and queuer 206. This structure is repeated in the other CERs and the PERs of FIG. 1. Thus, although the following description references CER 112, it is equally applicable to other edge routers 112-128 in the example of FIG. 1.

The example marker 202 of FIG. 2 implements a set of rules to determine how incoming traffic to a CER 112 or PER 122 is to be assigned to a particular CoS based on packet parameters. In the illustrated example, the parameters are found in the header of a packet and include the source and destination IP addresses, source and destination ports, protocol, and the ToS field. The ToS field value is included because the classification decision may depend on the ToS field value set by a prior device in the routing path (e.g., a router at the customer site 102). When the marker 202 of the router 112 receives a packet, the packet is marked according to the CoS configuration of the router and the packet parameters. Marking may include, for example, determining how to police the packet in the router and/or changing DSCP bits in the ToS field to reflect this determination.

The example policer 204 of FIG. 2 enforces rules that determine whether the arrival rate of the packets conforms to the specification for traffic associated with the CoS of the packet. For example, if packets marked "real-time" are arriving too slowly or too quickly (i.e., are nonconformant), the policer 204 may cause such packets to be marked differently. The policer 204 also implements rules that determine what action should be taken for nonconformant traffic. Conformant and nonconformant traffic of each data class may be assigned different DSCP bits to indicate that they are to be treated differently. In some router configurations, nonconformant traffic may simply be dropped (i.e., discarded, not forwarded).

The example queuer 206 of FIG. 2 routes packets to queues in accordance with polic(ies) which reflect the queuing discipline (e.g., RED, Weighted Fair Queuing) and attributes of the queue for each class on the outgoing link from each router. Policed packets received from the policer 204 are placed by the queuer 206 into different queues according to the policy triggered by the respective ToS bytes of the policed packets. The packets are then output from the queuer of the router in accordance with the operation of the respective queues. Overall, configuring and/or establishing CoS policies (e.g., marking, policing, and/or queuing) can be an involved and tedious process that shall be carefully performed to accurately reflect the complex choices made by the designer.

Figure 3:
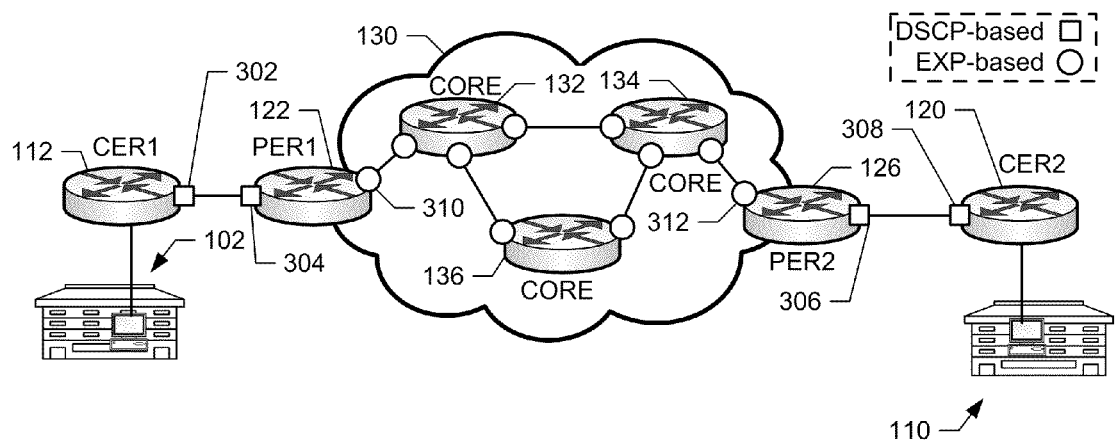
FIG. 3 illustrates an example virtual private network connection between two sites in the network of FIG. 1.

FIG. 3 illustrates an example VPN connection between two sites 112 and 120 in a network (e.g., the network 130 of FIG. 1). FIG. 3 illustrates the types of policies applied between edge routers (e.g., CERs 112 and 120 and PERs 122 and 126). Based on an SLA and customer input, a network design engineer or technician determines the CoS policies to be instantiated at each CER 112 and 120 and PER 122 and 126 for the VPN. Realizing a complete CoS design requires instantiation of policies across multiple stages within a router (e.g., the policer 204 and the queuer 206 stages in a CER 112) and across multiple routers 112, 120, 122, and 126. Each router 112, 120, 122, and 126 or router stage 202, 204, and 206 may modify the packet headers or MPLS labels to determine how the packets are treated at the next stage 202-206 or router 112, 120, 122, and 126.

Each of the illustrated routers 112, 120, 122, 126, and 132-136 has a CoS policy that is either DSCP-based or experimental bits (EXP)-based. The CERs 112 and 120 interface with the respective PERs 122 and 126 via DSCP-based interfaces 302-308. The PERs 122 and 126 interface with the core routers 142 and 144, (which also interface with each other and the core router 146) via EXP-based interfaces 310 and 312. Thus, the PERs 122 and 126 convert CoS treatment between DSCP-based and EXP-based treatment as packets move between the CERs 112 and 120 and the backbone network 130.

FIG. 4 illustrates example pseudocode 400 that may be used to implement a class of service configuration file in a CER (e.g., 112). In the illustrated example, the CoS policy is highly nested, with several dependencies that exist across different logical groups of the configuration. As shown in FIG. 4, lines 29-31 configure a LAN-facing Ethernet interface policy-map and lines 32-34 configure a PER1-facing WAN interface policy map. The WAN interface policy is associated with a single policy construct embedding two egress policies (e.g., implemented by the policer 204 and queuer 206).

Lines 18-28 configure a queuing policy WAN-EGRESS-POLICER-QUEUE, which calls and/or handles classes REALTIME, CRITICAL-DATA, and class-default. Lines 7-17 configure example policing rules REALTIME-POLICER, CRITICAL-DATA-POLICER, OTHER-CRITICAL-DATA, and BEST-EFFORT-MARKER. Each of the configurations begins with the keyword "policy-map" and is organized into multiple sub-blocks, each of which starts with the keyword "class."

The policing rules further call "class-maps" to define the behavior of traffic marked according to the respective classes. For example, the REALTIME-POLICER policy polices the REALTIME class and calls the REALTIME class-map. Each of the class sub-blocks corresponds to a particular class of traffic, and defines the (policing or queuing) rules for that class. Each class-map block may be associated with multiple ACLs.

The nesting of rules used to configure the CERs lends itself to misconfiguration. For example, in the policy-map block in lines 18-28, if the class-map REALTIME had a catch-all clause (e.g., all traffic is matched) then no traffic would match the class CRITICAL-DATA. As a result, no traffic would be sent to the CRITICAL-DATA queue. This result is not obvious from a casual inspection of the configuration. A policy corresponding to a traffic class that can never see traffic is referred to herein as a shadowed policy, and can cause inefficiencies or may be the result of misconfigurations.

Figure 5:
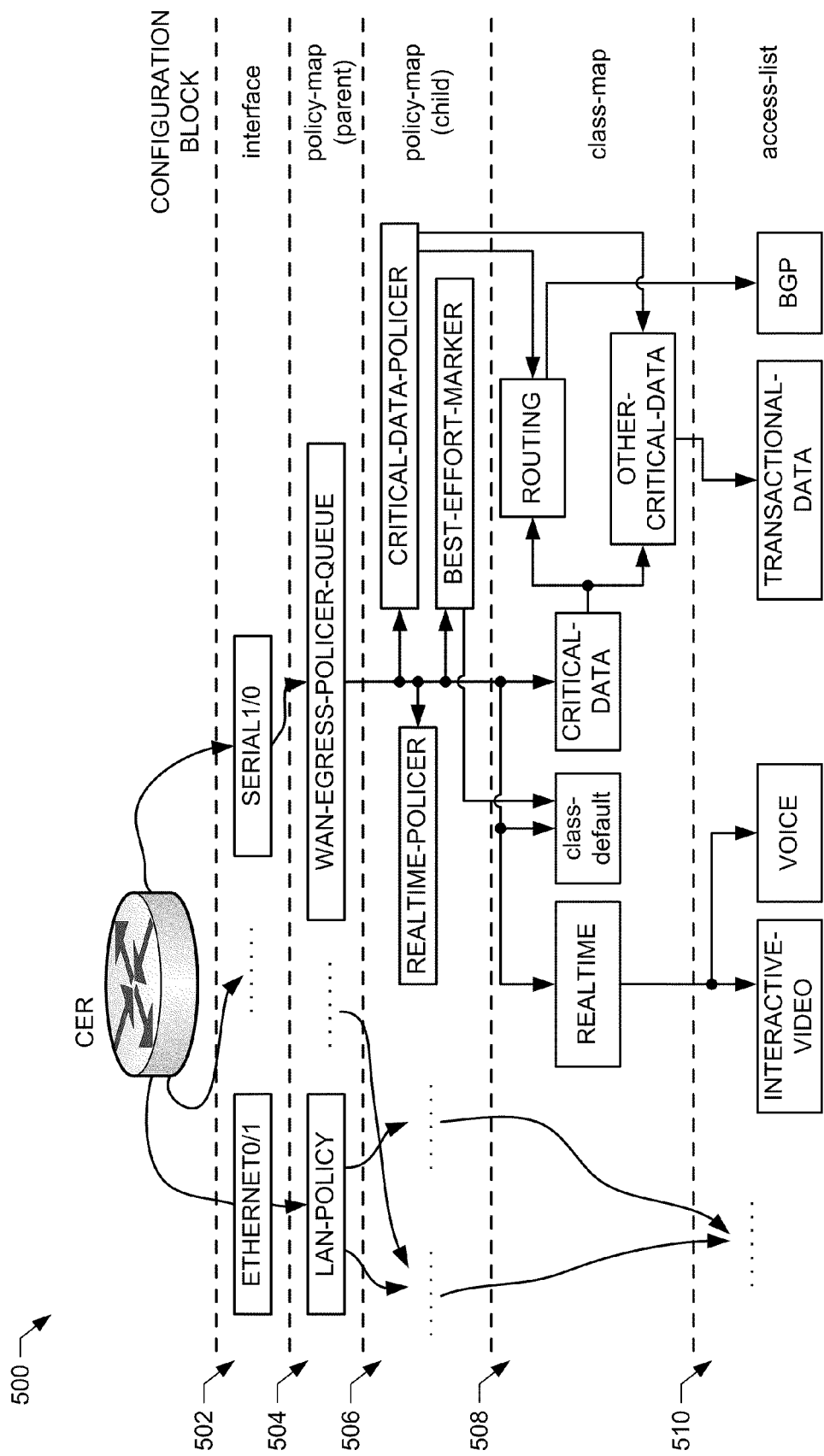
FIG. 5 is a chart illustrating syntactic dependencies of the CER configuration of FIG. 4.

FIG. 5 is a chart 500 illustrating syntactic dependencies of the CER configuration of FIG. 4. Configurations with highly nested structure as illustrated in FIGS. 3 and 4 are hard to manually navigate and interpret. As illustrated in FIG. 5, the CoS configuration is associated with complex ordering relationships. The example configuration of FIG. 5 includes an interface level 502, a policy map (parent) level 504, a policy map (child) level 506, a class-map level 508, and an access-list level 510. To determine the classes of service to be applied to a packet, each level of the chart 500 is accessed, either directly or via a subroutine. A network operator attempting to navigate the structure of the chart to determine the treatment of a packet manually and recursively traces through a large portion of the chart, which carries a high cost to the service provider in terms of time and money.

FIG. 6 illustrates example pseudocode 600 that may be used to implement a CoS configuration file in a PER (e.g., 122 of FIG. 1). When the PER 122 receives a packet from a CER 112 destined for the network 130, the PER 122 first marks the packet via a WAN-INGRESS-MARKING policy in lines 8-15. The WAN-INGRESS-MARKING calls class-maps for the REALTIME and CRITICAL-DATA classes of service. The respective class-maps are configured in lines 1-6 to determine the CoS to be provided to a packet.

As shown in the policy-map in lines 8-15, the appropriate EXP value in the MPLS label which is used to control treatment of a packet in the backbone network is set based on the DSCP value matched to a class-map. Determining the DSCP value in turn involves tracing through the configuration of CER1 (e.g., the pseudocode 400 of FIG. 4). Additionally, traffic is labeled with the same EXP bits for multiple DSCP values of 48, 26, and 28. Thus, though traffic belonging to different classes may be treated differently at the CER-PER interface, they are treated in the same way in the backbone network. Given such complexity in design, determining the end-to-end treatment of a packet is based heavily on determining any potential transformations performed by the routers on a packet's path of travel.

Figure 7:
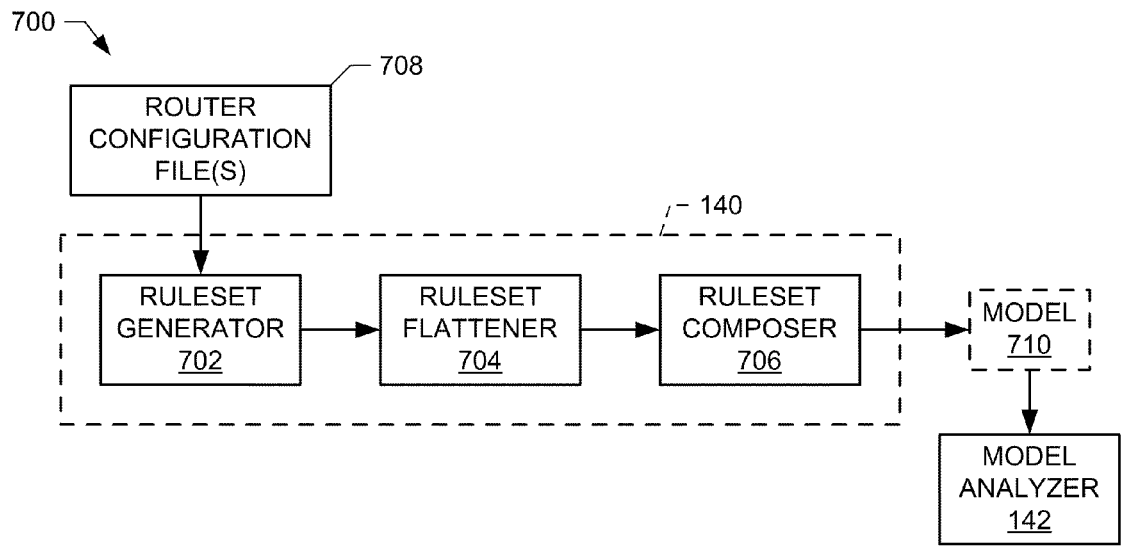
FIG. 7 is a block diagram of an example class-of-service modeler used in the enterprise virtual private network of FIG. 1.

FIG. 7 is a block diagram of the example CoS modeler 140 used in the enterprise VPN 100 of FIG. 1. The example CoS modeler 140 receives router configurations and models the CoS treatments of the VPN 100. The CoS modeler 140 of FIG. 7 includes a ruleset generator 702, a ruleset flattener 704, and a ruleset composer 706. To generate a CoS model of an enterprise VPN, the CoS modeler 140 receives one or more router configuration file(s) 708 and produces a ruleset that models a subpart of a router (e.g., CER 112) function.

A ruleset is represented as a table F that maps an input N-tuple flow f (i.e., a flow having N fields) to an output action. The term j refers to the column in the table F, and the term i refers to the row. In this example, the flow f has a six-field (6-tuple) IP header. Each column j in the table F is associated with either a basic input variable (e.g., source IP) $v_j$ or another ruleset $F_j$, which is itself represented as another mapping table. Let $vars_F = \{j | \text{column } j \text{ is associated with a variable}\}$ (i.e., $vars_F$ is the set of columns j for which a variable may be matched). For $j \in vars_F$ (i.e., column j is a variable) the cell $F_{ij}$ specifies a match expression where an input variable either matches or does not match cell $F_{ij}$. The match expression can include wildcards (e.g., "do not care" values) and/or ranges of values similar to known ACLs. For $j \notin vars_F$ (i.e., column j is another ruleset), the cell $F_{ij}$ contains a subset of possible outputs that could be produced by a sub-ruleset $F_j$. In addition, for each row i, an output action column act(i) gives the output of the respective row i.

In this example, a ruleset may be considered as a generalization of one or more ACLs. A standard ACL has only 2 outputs: 'permit' and 'deny.' The ACL can thus be seen as a function from the inputs to these two values. However, a ruleset generalizes ACLs in a few ways. First, a ruleset may recursively depend on other rulesets. Second, a ruleset permits a broader range of actions than simply permitting and denying. Third, a ruleset may have an output action that can transform an input, and forward it to another ruleset. However, only the root ruleset may have the general output action that can change the input and forward it to another ruleset. Other rulesets in this example are restricted to having simple outputs.

For each router (e.g., CERs 112-120, PERs 122-128), the ruleset generator 702 constructs a ruleset to model each subpart of a router function from the configuration files. The ruleset generator 702 generates a representation of the ruleset that is recursive, such that a ruleset may depend on one or more other rulesets. The recursive dependencies reflect the nested structure of the router configuration files. While the recursive representation may be easily derivable from the router configuration file(s), the representation is not easily amenable to composition. The ruleset flattener 704 flattens the ruleset from the recursive representation to a non-recursive representation. Given an input flow f, the ruleset flattener 704 evaluates a ruleset by recursively evaluating the sub-ruleset $F_j$ for each $j \notin vars_F$. Flow f is said to match a row i if and only if it matches every cell in row i, taking into account wildcard cells. The table output F(f) is defined as the output action act(i) for the row with the smallest index i that matches f (i.e., the action for the first-matching row is taken). If no match is found until the end of the table, a special output "empty" may be associated with the flow f. To flatten the ruleset, the example ruleset flattener 704 uses set operations as described in more detail below.

The ruleset composer 706 receives the flat rulesets for multiple routers and models the network-wide CoS treatment of a flow as a tree of rulesets including multiple CERs 112-120 and PERs 122-128. Each ruleset in the composed ruleset is allowed to transform or modify the input flow prior to sending it to the next router (i.e., ruleset). The CoS configuration of each CER may be individually modeled as a part of this structure with multiple rulesets corresponding to the marking, policing, and queuing policies. The ruleset composer 706 collapses the tree of rulesets into one single ruleset representative of overall CoS behavior of the enterprise VPN 100. The operation of the ruleset composer 706 is described in more detail below.

The flat representation of a ruleset F includes a set of unique output actions $\{a_l\}$ and an associated subset $S(F, a_l)$ including all inputs for which action $a_l$ is invoked. The subsets S(F,$a_l$) are nonoverlapping (e.g., $l \neq l' \Rightarrow S_l \cap S_{l'} = \emptyset$), which makes the ordering of the actions irrelevant.

The rule flattener 704 generates a flat representation of a ruleset from its recursive representation using set operations. The flat representation of a ruleset F includes a set of unique output actions $\{a_l\}$, and an associated subset S(F, $a_l$) including all inputs, for which action $a_l$ is triggered. Let M(F, k) denote the set of flows f that match row k of ruleset F. Let FM(F, k) denote the set of flows f that match row k of ruleset F and none prior to it. We can define S(F,A) to be the set of flows f for which the ruleset F produces an output action A. Equations (1), (2), and (3) below represent M, FM, and S in set theory notation.

$$S(F,A) = \cup_{\forall k, act(k) = A} FM(F,k) \quad \text{Equation (1)}$$

$$FM(F,k) = \cap_{i=1}^{k-1} (\neg M(F,i) \cap M(F,k)) \quad \text{Equation (2)}$$

$$M(F,k) = \cap_{j \notin var S_F} S(F_j, F_{kj}) \cup_{j \notin var S_F} \{f | v_j(f) \in F_{kj}\} \quad \text{Equation (3)}$$

Some policies may be expressed in terms of a single ruleset. However, a CoS policy typically needs multiple rulesets. In the CoS context, for example, there are separate marking, policing, and queuing policies that together define the CoS design in a CER. The CoS modeler 140 models each CoS policy as a ruleset that receives an input flow and produces an output flow. The output from a previous CoS policy (e.g., a policing policy) becomes an input to the next policy (e.g., a queuing policy). Further, the ruleset composer 706 may determine the end-to-end CoS policy and/or a single ruleset. The single ruleset is generated or transformed by composing the rulesets in each of the CERs 112-120, PERs 122-128, and/or core routers 142-148 along the path.

The ruleset composer 706 has two primary considerations when composing rulesets. First, an output action may change an aspect of the input flow (e.g., the marking action modifies the DSCP field). Second, any one or more actions may change the path of the flow through the VPN 100. For example, a policing policy may choose to drop nonconformant traffic while allowing conformant traffic to continue on the path. Thus, the ruleset composer 706 describes an end-to-end policy using a tree of nodes, where each node of the tree has a ruleset. Each unique output action in a ruleset is a triplet (i.e., tag, func, next). Tag is a sequence of string tags representing output actions encountered so far. Func is a mapping of the input (e.g., setting the DSCP bits). Next is a reference to another node. Next may be an empty reference in the case where the flow stops. Note that rows in leaf nodes have an empty next field (e.g., the flow has reached its destination), but rows in internal nodes may also have empty next fields (e.g., the flow is dropped). An input flow starts at the root of the tree and will then get forwarded to the next node until the empty next field is reached. The func field, if not empty, will transform the input. The output action is the concatenation of all the tags on the path. After composing a ruleset to generate a CoS model 710, the CoS modeler 140 passes the model 710 to the flow analyzer 142.

The following is an example method that the ruleset composer 706 may use to compose a ruleset. Given a node n and a child node n' (i.e., the next node in the routing path), the ruleset composer 706 combines or collapses the nodes n and n' by replacing the ruleset in node n' with a combined ruleset and redirecting any node that previously referred to n to now refer to n'. In particular, let S(F,A) and S' (F,A) be the flat representations for the rulesets in nodes n and n', respectively. The flat representation of the combined ruleset (denoted by S") is a cross-product construction with S(F,A) and S' (F,A). The flows belonging to output actions in S(F,A) that have next=n' with the corresponding flows S' (F,A) using the func mapping, and leave the other flows in S(F,A) unchanged. Equations (4) and (5), respectively, define the set of flows $S''_{l \rightarrow l'}$ (F,A) associated with the combined action $a_{l \rightarrow l'}$ in S" (F,A). The output actions $a_{l \rightarrow l'}$ are also a composition of the action $a_l$ and $a_{l'}$. The output action field $tag_{l'}$ is the concatenation of $tag_l$ and $tag_{l'}$. The func of action $a_{l \rightarrow l'}$ is the function of $func_{l'}$ that operates on the output or result of $func_l$ from node n. The next field is simply the next field from node n'. Thus, the composition incorporates the ruleset (i.e., operations) of node n into node n', and the output action $a_{l \rightarrow l'}$ is the same as if the actions $a_l$ and $a_{l'}$ were performed at the separate nodes n and n'.

$$S''_{l \rightarrow l'} = \{f | f \in S_l \text{ and } a_l(f) \in S'_{l'}\} \quad \text{Equation (4)}$$

$$a_{l \rightarrow l'} = \{tag_l \rightarrow tag_{l'}, func'_{l'} \circ func_l, next_{l'}\} \quad \text{Equation (5)}$$

Note that if $S''_{l \rightarrow l'}$ is empty, we just delete it from S". With ruleset composition, any tree of rulesets may be composed into a single node representation by the ruleset composer 706. Thus, for a sequence of tags that explain the per-ruleset treatment of a set $S_l$ of flows along a path, $func_l(S_l)$ will describe how the flows are transformed at the end of the path. By examining the path of tags, design patterns and any misbehavior can be discovered.

Figure 8:
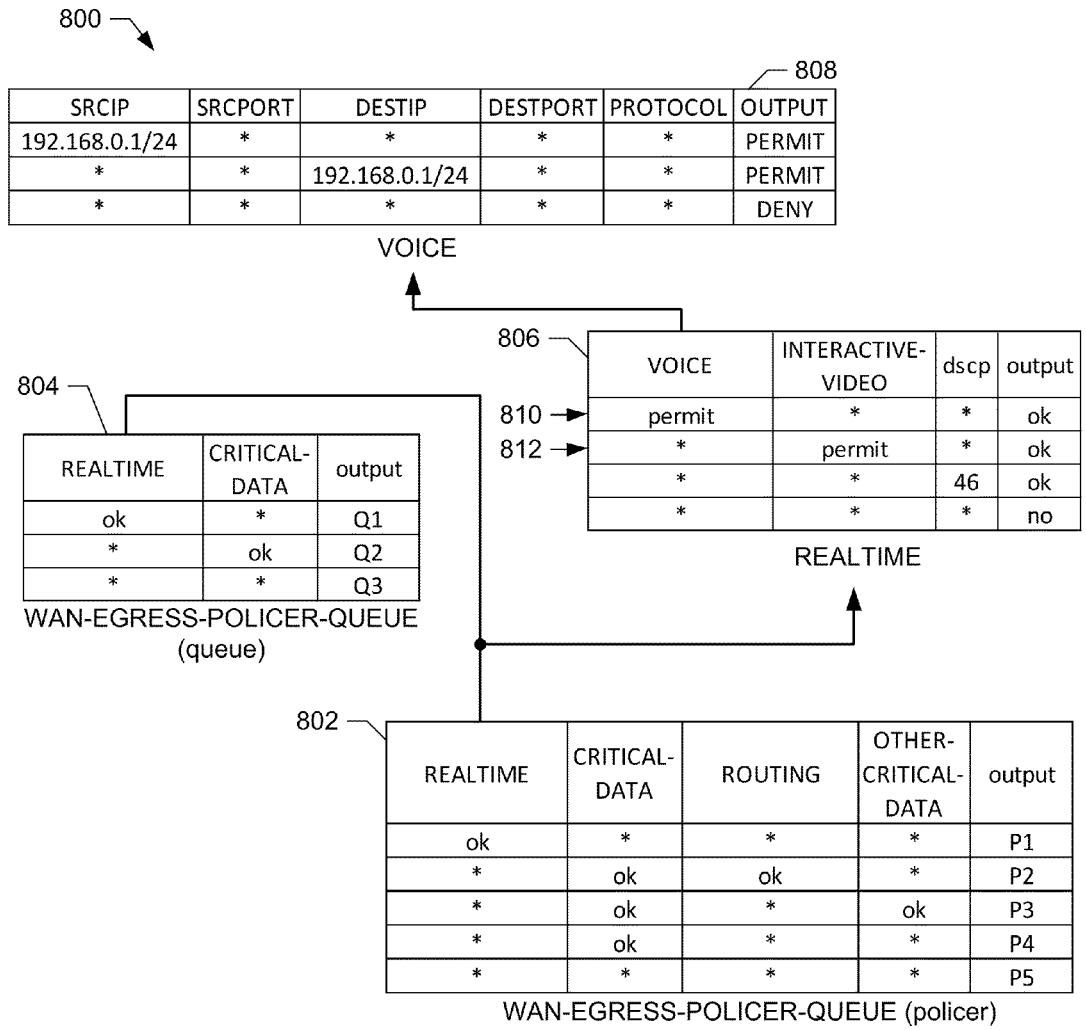
FIG. 8 is a recursive representation of an example ruleset generated from router configuration files.

FIG. 8 is a recursive representation of an example ruleset 800 generated from router configuration files by the example ruleset generator 702 of FIG. 7. The example ruleset 800 is generated using multiple ACLs, where each ACL is represented as a ruleset or a sub-ruleset. The ruleset 800 includes rulesets 802 and 804 and sub-rulesets 806 and 808. The policy-map WAN-EGRESS-POLICER-QUEUE described in FIG. 4 is represented as rulesets 802 and 804, each of which depends on the class-map sub-ruleset 806 REALTIME. The class-map ruleset 806 REALTIME further depends on the access-list sub-ruleset 808 VOICE. The dependencies are directly derived from a configuration file such as the pseudocode 400 or 600 of FIG. 4 or 6. Each column j in the sub-ruleset 806 refers to outputs of an ACL ruleset (e.g., the first column refers to the VOICE ruleset) or a variable vars$_F$ (e.g., DSCP column). The first row 810 is matched when the VOICE sub-ruleset 808 produces an output of "permit." A flow matching the first row 810 is associated with the output ok. The second row 812 is matched for flows f not matching the ruleset VOICE, but matching another ruleset INTERACTIVE-VIDEO (not shown). The remaining rows are matched in a similar manner.

The example ruleset 802 illustrates an example of how the policing rules expressed in lines 7-17 and 18-28 of FIG. 4 may be represented. Each column j corresponds to a class-map sub-ruleset (e.g., REALTIME 806). The outputs of the rows in the ruleset 802 are respective policy rules P1-P5, which may cause, for example, modifying DSCP bits, dropping packets, and/or other appropriate policing actions. In the illustrated example, the policing rule P2 is invoked only if both CRITICAL-DATA and ROUTING are matched, and REALTIME is not matched (i.e., if REALTIME is matched, the policing rule P1 would be invoked before P2 could be invoked). A policy rule is only invoked if the cells in row i are completely matched by the flow f variables and/or sub-rulesets 806 and 808.

FIGS. 9A, 9B, and 9C illustrate an example composition of multiple rulesets. FIG. 9A shows an example tree of flat rulesets including marking (M) 902, policing (P) 904, and queuing (Q) 906 flattened rulesets. Each output action is stored in a tag (e.g., M1 contains the marking action set DSCP=10). For the example M ruleset 902, any flow f not from the 1.2.2.0/24 subnet matches a ruleset row 908 and has an output action (e.g., (tag, func, next)) equal to (M4, set DSCP=40, P). The func of the ruleset row 908 marks the flow (e.g., the ToS byte) with a DSCP of 40. In contrast, any flow from 1.2.2.0/24 matches a ruleset row 910 and has an output action (tag, func, next) equal to (M1, set DSCP=10, P). The func of the ruleset row 908 marks the flow (e.g., the ToS byte) with a DSCP of 10.

The P ruleset 904 examines the DSCP value of flows output from the M ruleset and performs the corresponding output action. For flows marked with DSCP of 10 (e.g., ruleset rows 912 and 916), nonconformant traffic is dropped (e.g., row 912), which is modeled with the next field pointing to a special leaf node drop 918. Conformant traffic has the DSCP set to 10 (e.g., row 916). For flows marked with DSCP 40 (e.g., ruleset row 914), no action is taken. Ruleset rows 914 and 916 forward the flow on to the Q ruleset 906.

In the Q ruleset 906, flows marked with DSCP of 10 go into a Q1 queue (e.g., ruleset row 920), and flows with all other DSCP values goes into the Q4 queue (e.g., ruleset row 922). After flows are queued, the overall treatments of the flows are returned (by having the next field of the output action for rows 920 and 922 pointing to a leaf node done 924).

FIG. 9B shows the rulesets after composing the M and P rulesets. The result of composing the M and P rulesets is a composed ruleset 926. The composed ruleset includes ruleset rows 928, 930, and 932, which accept the same flows as the marking ruleset 902, treat the flows the same ways as the rulesets 902 and 904 (e.g., based on the source IP address (srcIP) field), and generate the same outputs as the policing ruleset 904. For example, the composed ruleset 926 drops nonconformant traffic having a srcIP field belonging to the 1.2.2.0/24 subnet. Other flows are transmitted to the queuing ruleset 906 with a DSCP field set by the composed ruleset 926 based on the srcIP field of the input flow.

FIG. 9C shows the rulesets after composing the M, P, and Q rulesets. The result of composing the M, P, and Q rulesets (e.g., by composing the composed ruleset 926 with the queuing ruleset 906) is a composed ruleset 934. The composed ruleset 934 includes ruleset rows 936, 938, and 940 and treats flows in the same ways as the rulesets 902, 904, and 906 of FIG. 9A and/or the composed ruleset 926 in combination with the queuing ruleset 906 as shown in FIG. 9B.

Figure 10A:
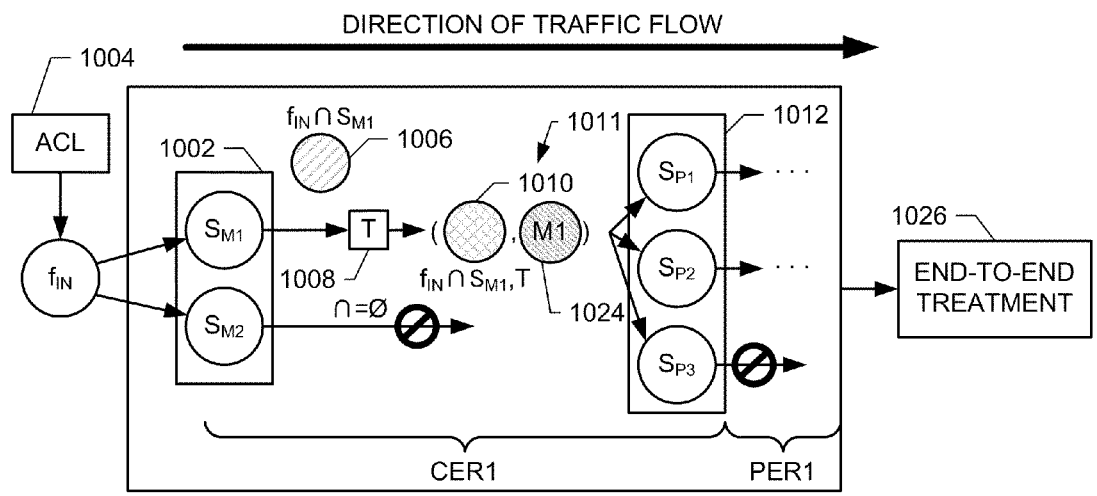
FIG. 10A illustrates an example end-to-end path including composed rulesets including an example transformer.

FIG. 10A illustrates an example end-to-end path including composed rulesets. As described above, flattening and composing rulesets involve performing operations on sets such as union, intersection and comparison operations. In general, performing such operations on large, multi-dimensional rulesets is computationally expensive. In fact, in some example data-sets, intuitive approaches to combining rulesets, such as using simple cross-products of the recursive representations of the rulesets, could result in computation times of several days for configurations in a single enterprise VPN.

To efficiently describe a set of flows and perform set and function operations on flowsets, the example CoS modeler 140 uses binary decision diagrams (BDD) as representative data structures to model the rulesets and flowsets. A BDD is an efficient data structure that can compactly and canonically represents a Boolean function as a directed acyclic graph. A single flow is captured by a 6-tuple including the source and destination IP addresses (srcIP and destIP) and ports (srcPort and destPort), the protocol, and the ToS byte. Every bit of each of the fields corresponds to a BDD variable. For example, an IP address would be modeled with 32 BDD variables because a version four IP address (IPv4) has 32 bits. It is also relatively easy to determine membership (e.g., whether a particular flow is a member of the given flowset) using BDDs. While standard set operations are easily implementable with BDDs, composition further uses the func operator described above, which allows the transformation of a subset of nodes in a BDD to support the marking actions in Equation 5.

In the example of FIG. 10A, the flat representation of each basic ruleset is precomputed using BDDs by performing the set operations described above in Equations 1-3. For example, the ruleset corresponding to a marker 1002 is represented by BDDs $S_{M1}$ and $S_{M2}$. Each marking BDD $S_{M1}$ and $S_{M2}$ corresponds to a set of flows that are associated with marking actions M1 and M2, respectively. A network operator enters an ACL 1004, which is converted to a flowset described by a BDD $f_{in}$. By performing intersections of the flows $f_{in}$ with $S_{M1}$ and $S_{M2}$, the CoS modeler 140 generates the subset of input flows $f_{in}$ that are marked M1 and M2. In the illustrated example, the intersection of $f_{in}$ and $S_{M2}$ is a null set, and therefore all flows $f_{in}$ are marked as M1.

When a policy (e.g., the marker 1002) changes the ToS byte of a flow (e.g., the flow $f_{in}$), the output BDD 1006 (flow $f_{in} \cap S_{M1}$) is subject to a transformer 1008 before the resultant BDD 1010 enters the next stage (e.g., the policing policy 1012). In the illustrated example, the transformer 1008 of the output BDD 1006 includes removing all BDD nodes corresponding to bits in the ToS byte, constructing a separate BDD using the new ToS value alone, and merging the two BDDs together using a set-union operation to create the transformed BDD.

To remove the ToS byte, the CoS modeler 140 applies the existential quantification technique to the output BDD 1006 with respect to the ToS bits. Existential quantification is a BDD technique that has been used to remove a variable from a BDD without affecting the satisfiability of the BDD. Using existential quantification, the variables corresponding to the ToS bits are removed from the output BDD 1006. The removed ToS bits or variables are then used to construct a new BDD, which is merged with the modified output BDD 1010 using, for example, a set-union operation. The transformer 1008 ensures that the output flows 1006 from the marker 1002 are marked with M1. Depending on the input flow $f_{in}$ and the marking BDDs $S_{M1}$ and $S_{M2}$, the transformer 1008 may not be necessary to achieve the correct marking. Additionally, transformations may occur after any policy block (e.g., 1002, 1012) as appropriate. While the illustrated example transformer 1008 includes a modification of the ToS byte, other transformations may also be utilized. When the composition is completed, the end-to-end treatment 1026 of the example flowset $f_{in}$ is output.

Figure 10B:
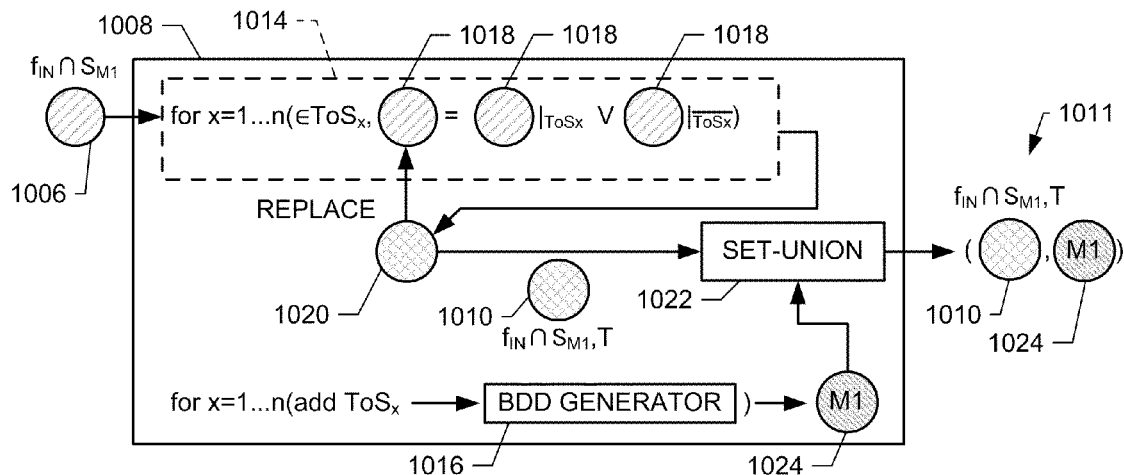
FIG. 10B is a more detailed block diagram of the example transformer of FIG. 10A.

The example transformer 1008 of FIG. 10A is illustrated in more detail in FIG. 10B. As illustrated in FIG. 10A, the transformer 1008 receives an output BDD (e.g., 1006) from a marking policy (e.g., 1002) and outputs a transformed BDD 1011 generated from a modified output BDD 1010 and a BDD 1024. The transformer 1008 includes an existential quantifier 1014 and a BDD generator 1016. The existential quantifier 1014 receives the output BDD 1006 and existentially quantifies away the bits (i.e., variables) corresponding to the ToS byte from the output BDD 1006 to ensure that the flow associated with the output BDD 1006 is properly treated with the ToS from the marker 1002. In the illustrated example, existential quantification of a BDD is performed by the existential quantifier 1014 according to equation 6, where b is a Boolean function (e.g., BDD) and v is a variable.

$$\exists v(b) =_{def} b|_v \vee b|_{\bar{v}}$$ Equation (6)

In the example of FIG. 10B, the Boolean function b of Equation 6 is a BDD 1018 that is initially populated by the output BDD 1006. The existential quantifier 1014 existentially quantifies away a first variable v, where the variable is the first ToS bit $ToS_x$ and x is initially one (1). As a result of the existential quantification, the existential quantifier 1014 outputs a BDD 1020 that has been reduced by the variable $ToS_x$ (e.g., $ToS_1$). The BDD 1020 is then used by the existential quantifier 1014 as the Boolean function b for the next loop (e.g., v=$ToS_2$). Thus, the existential quantifier 1014 removes the ToS bits from 1 to n by existentially quantifying the ToS bits away from the BDD 1006. In the example of FIGS. 10A and 10B, n is equal to eight (8), because the BDD 1006 includes a ToS byte (i.e., 8 bits). When all of the ToS bits have been existentially quantified away, the resultant BDD 1020 (i.e., the modified output BDD 1010) is input to a set-union processor 1022.

The ToS bits that are removed from the BDD 1006 are input to the BDD generator 1016, which generates a BDD 1024 that enforces the marking policy M1. The BDD 1024 is generated to be an efficient BDD that may be used to determine whether a flow corresponds to the ToS byte associated with the marking policy M1. After the BDD 1024 is generated, the BDD 1024 is combined with the modified output BDD 1010 using a set-union processor 1022 to generate the transformed BDD 1011. The transformed BDD 1011 intersects with the next policy ruleset (e.g., the policing ruleset 1012) as illustrated in FIG. 10A.

Figure 11:
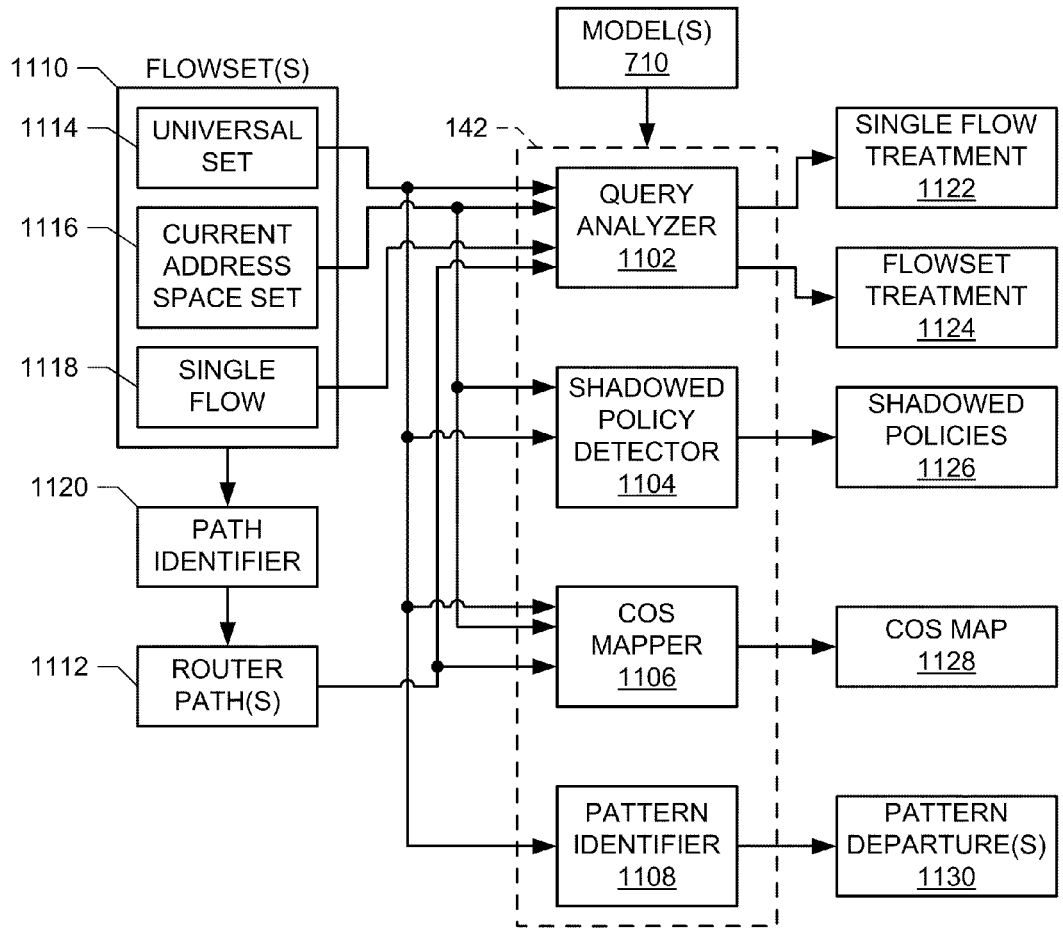
FIG. 11 is a more detailed block diagram of the model analyzer of FIG. 1.

FIG. 11 is a more detailed block diagram of the example model analyzer 142 of FIG. 1. The model analyzer 142 receives one or more CoS models (e.g., the model 710 of FIG. 7) representative of respective enterprise VPNs from the CoS modeler 140 of FIG. 7. The example analyzer 142 analyzes the model(s) to determine information about an enterprise VPN. The example model analyzer 142 may include any one or more of a query analyzer 1102, a shadowed policy detector 1104, a CoS mapper 1106, a pattern identifier 1108, and/or any other CoS analysis tools.

In addition to a CoS model 710, the example query analyzer 1102 receives flowset(s) 1110 and router path(s) 1112. The flowset(s) 1110 may include a universal flowset 1114 including all possible flows that may be received by the router (e.g., CER, PER) represented by the model 710, a current address space flowset 1116 including flows corresponding to traffic from the source addresses within the address space of the router, and/or a single flow 1118 of interest to an operator. The query analyzer 1102 may further receive a list of the routers and/or router path(s) between the CERs and/or PERs.

An operator specifies one or more flowsets 1110 for which flow treatments are to be determined, and a list of all router paths 1112 of interest. In the illustrated example, a path identifier 1120 also receives the flowset(s) 1110 and determines the router path(s) 1112. For example, the operator specifies source and destination IP addresses of the flow and the path identifier 1120 identifies the appropriate routers between the IP addresses by examining PER forwarding tables for each CER interface. Specifically, each PER 122-128 has a separate forwarding table known as a VRF (Virtual Routing and Forwarding) for each CER-facing interface. The VRF table is accessed by, for example, the PER 122 to determine how to forward traffic that arrives from the CERs 112 or 114.

The path identifier 1120 determines the address space of each CER interface by finding all addresses in the VRF for which the CER interface is used as the next hop. When a network operator wishes to determine the treatment of one or more flows between two IP addresses, the CER interfaces to which the addresses belong are first identified based on the extracted address space information. Once the CERs are determined, the path identifier 1120 identifies the PERs to which the identified CERs are attached by correlating interfaces whose IP addresses fall into the same subnet from the router configurations. For redundancy and/or load-sharing reasons, a CER may be attached to multiple PERs, or may have multiple links to a PER. In such scenarios, the path identifier 1120 determines the possible paths (e.g., all possible paths) between the pair of CERs and traces the CoS treatment along each path. In the illustrated example, the path identifier determines the CoS treatment of source and destination CERs and the PERs to which they are attached.

In some VPNs, traffic between two CERs may be tunneled through another intermediate CER. The example path identifier 1120 may also provide information about the CoS treatment at the intermediate CER if both forwarding table data and routing table data are used.

The query analyzer 1102 may output a single flow treatment 1122 when, for example, an operator inputs a single flow 1118 into the query analyzer 1102. Additionally or alternatively, the query analyzer 1102 may output a flowset treatment 1124 (e.g., multiple flow treatments) when a universal flowset 1114 and/or a current address space flowset 1116 is input by an operator. The example shadowed policy detector 1104 receives a universal flowset 1114 and/or a current address space flowset 1116 and determines one or more shadowed policies 1126 as described in more detail below. The CoS mapper 1106 receives a universal flowset 1114 or current address space flowset 1116 and generates a CoS map 1128. The CoS map 1128 may include, for example, the CERs 112-120 in an enterprise VPN 100 and the CoSs associated with the CERs 112-120. The pattern identifier 1108 receives the universal flowset 1114 and may determine patterns among the same enterprise VPN 100 and/or among different enterprise VPNs, evaluate the patterns for best practices, and/or determine any deviations from the patterns.

Figures 12, 13:
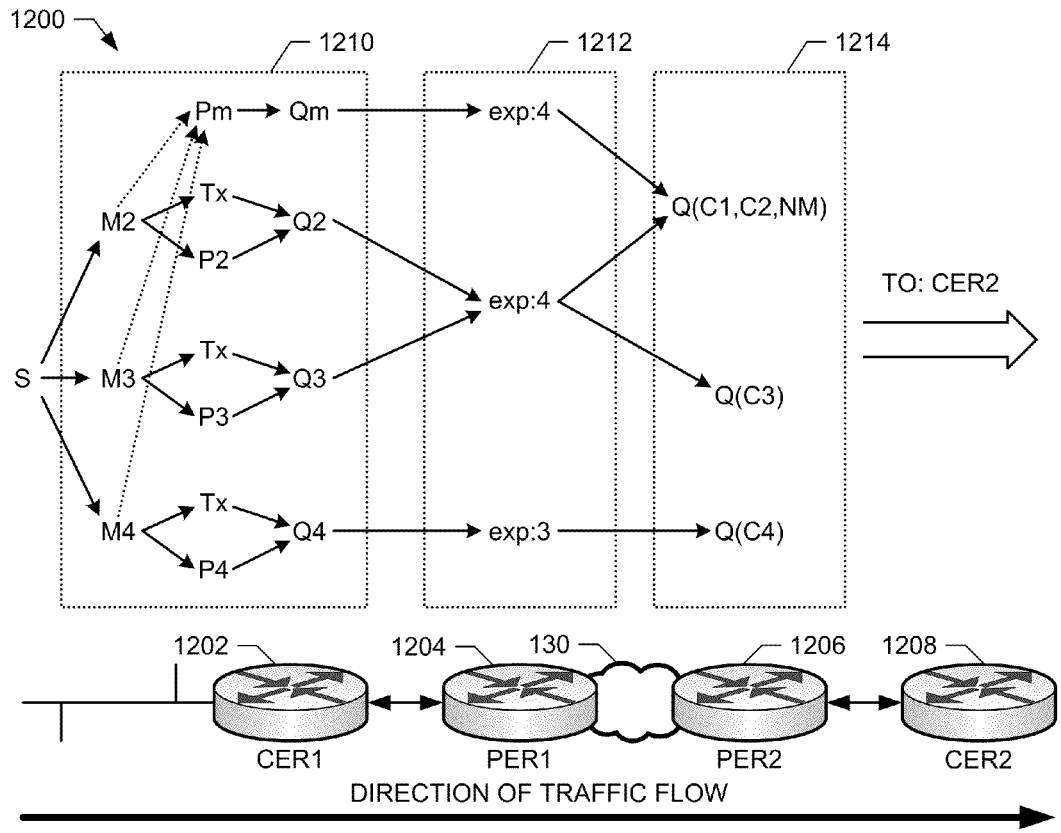
FIG. 12 illustrates an example end-to-end flow treatment diagram.
FIG. 13 is a table illustrating example query parameters that may be applied to the model analyzer of FIG. 1 to determine the treatment of one or more flows using a CoS model.

FIG. 12 illustrates an example end-to-end flow treatment diagram 1200. The example diagram 1200 shows an end-to-end path between the two CERs along a path including CER1 1202-PER1 1204-backbone network 130-PER2 1206-CER2 1208 in an example enterprise VPN. The example diagram 1200 may reflect an example flowset treatment 1124 generated by the query analyzer 1102 of FIG. 11. A first treatment diagram 1210 illustrates the paths taken within CER1 1202, a second treatment diagram 1212 illustrates the actions taken at the ingress interface of PER1 1204, and a third treatment diagram 1214 illustrates the actions taken at the egress of PER2 1206.

At the input interface of CER1 1202, traffic from a customer site (S) (e.g., the enterprise site 102 of FIG. 1) may be marked using one of markers M2, M3, or M4 as belonging to respective ones of classes C2, C3, or C4. Traffic corresponding to the classes C2, C3, and C4 is policed according to corresponding parameters determined by policers P2, P3, and P4. Compliant and noncompliant traffic of the different classes C2, C3, and C4 is then queued in separate queues Q2, Q3 and Q4.

Additionally, a subset of traffic marked as belonging to each of the classes C2, C3, and C4 is transmitted without checks for compliance (e.g., a policing rule Tx), and the subset of traffic is respectively queued in the appropriate class based on markings M2, M3, and M4 obtained at the input interface. This subset of traffic corresponds to SLA probe traffic, which may be included to help determine that the traffic corresponding to a particular class C2, C3, and/or C4 meets class performance metrics as specified in the SLAs. A network operator may explicitly desire to test the performance of compliant traffic, so the traffic should not be subject to normal policing checks and should not be remarked as non-compliant by the policers P2, P3, or P4.

Another subset of traffic marked as belonging to a class C2, C3, or C4 in the input interface are remarked as corresponding to network management traffic by the policer Pm. Example traffic in this subset is Simple Network Management Protocol (SNMP) query traffic and/or Border Gateway Protocol (BGP) routing update traffic, which is treated differently than the data classes. The network management traffic is queued separately in a queue Qm.

Traffic that exits CER1 1202 enters the ingress interface of PER1 1204. Based on the input ToS byte (e.g., the DCSP bits), PER1 1204 changes the EXP field in the MPLS label. The EXP value of network management traffic exiting the Qm queue in CER1 1202 is automatically set to a value of 4 regardless of compliance or noncompliance. In contrast, the EXP values of the traffic corresponding to data classes C2, C3, and C4 are changed based on compliance with traffic parameters for the respective classes C2, C3, and C4. In the illustrated example, traffic corresponding to two of the data classes (e.g., classes C2 and C3) is assigned an identical EXP value, which indicates that while CER1 1202 differentiates between traffic belonging to C2 and C3, traffic in classes C2 and C3 is treated identically in the MPLS backbone network 130. However, traffic in class C4 continues to be treated at a lower priority level (e.g., has an EXP value of 3) in the backbone network 130.

The third treatment diagram 1214 illustrates how traffic is treated as it exits PER2 1206 and before the traffic enters CER2 1208. While traffic belonging to classes C3 and C4 enters separate queues Q(C3) and Q(C4), the same queue Q(C1, C2, NM) is used for classes C1, C2, and network management (NM) traffic. However, the treatment of these traffic classes may still be different (e.g., the queue Q(C1, C2, NM) may treat the traffic with different drop probabilities). The example diagram 1200 illustrates the use of the model 710 to automatically extract patterns used by the network designer with respect to identifying treatment corresponding to various flows.

The example shadowed policy detector 1104 receives a universal flowset 1114 or a current address space flowset and determines whether the model includes any shadowed policies for the received flowset. For example, a CER (e.g., the CER 112 of FIG. 1) may have a queuing policy that treats four different classes. However, it is possible that no traffic is ever classified as belonging to one of the classes (e.g., C3), and the portion of the queuing policy corresponding to the class C3 is never exercised (i.e., is shadowed). Shadowed policy configurations may include two types of shadowing: (1) shadowing, which is shadowing that occurs when the universal set of flows are fed through a model 710 of a CER 112 and indicates that a portion of policy configuration is never utilized regardless of what traffic may flow through the CER 112; and (2) address space shadowing, which is shadowing that occurs only when the input flow contains a source address in the address space of the CER 112. Address space shadowing indicates that a portion of a policy configuration is not utilized given the current address space assignments to the CER. However, the portion of the policy configuration might be used later if the address space changes.

While the presence of shadowing might correspond to an inadvertent error made by the operator, the shadowing may also correspond to legacy configuration lines or even actual design intent. In an example where an entire class of service C4 is shadowed in a modeled CER, a potential explanation is that the shadowing occurs from deliberate design intent to remove class C4 from the modeled CER. To remove the class C4 from the CER, the operators may have modified the marking policy in the CER to no longer mark flows as corresponding to the C4 class but did not remove the policing and queuing rules already configured for the C4 class. A judgment regarding whether a particular example represents genuine design intent or an error can best be made by the appropriate operators after viewing the shadowed policy and the CER model generated by the CoS modeler 140.

FIG. 13 is a table 1300 illustrating example query parameters 1302, 1304, and 1306 that may be applied to the model analyzer 142 of FIG. 1 to determine the treatment of one or more flows using the CoS model generated by the CoS modeler 140 of FIG. 1. In particular, the query parameters 1302-1306 may be applied to the query analyzer 1102 of FIG. 11 to determine a single flow treatment 1122 and/or a flowset treatment 1124, and/or to audit the configuration(s) of one or more CERs 112-120. Each example query 1302-1306 includes a flowset 1308 and a corresponding ACL representation 1310.

The example query 1302 may be applied to the query analyzer 1102 to troubleshoot a flow and/or a flowset. The flowset 1308 for the query 1302 is operator-specified, because the query 1302 may be directed at any single flow or set of flows. The ACL representation 1310 of the query is also operator-specified because the ACL representation 1310 is derived directly from the flowset 1308. An example flowset 1308 permits traffic from the IP addresses 192.168.254.0 on subnet 255.255.255.0. A corresponding ACL representation of such an example flowset 1308 may be "permit 192.168.254.0/24 any." The query analyzer 1102 determines the CoS treatment of the operator-specified ACL representation 1310 by evaluating the composed ruleset as described above.

When auditing a CER (e.g., query 1304), the query analyzer 1102 may use either a universal flowset (e.g., ACL representation "permit any any") or may use the current address space for the CER being audited (e.g., ACL representation "permit AS(CER) any"). Using the current address space of the CER evaluates traffic from source IP addresses in the address space of the CER. In contrast, by using the universal flowset, the CER may be also audited for any latent problems that may arise if the address space changes for the CER. The query analyzer 1102 may further audit CoS policies between a pair of CERs using query 1306. Like the query 1304 for auditing a single CER, the query 1306 may audit the universal flowset between the CERs (e.g., ACL representation "permit any any") and/or may audit the flowset corresponding to the traffic with source and/or destination IP addresses corresponding to the address space of the two CERs (e.g., ACL representation "permit AS(CER1) AS(CER2)").

Figure 14A:
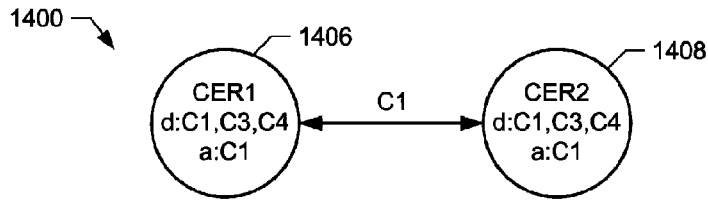
FIGS. 14A-14C illustrate class of service maps for example enterprise VPNs.
Figure 14B:
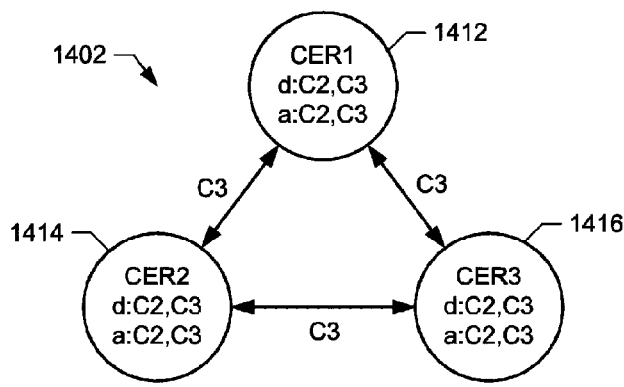
Figure 14C:
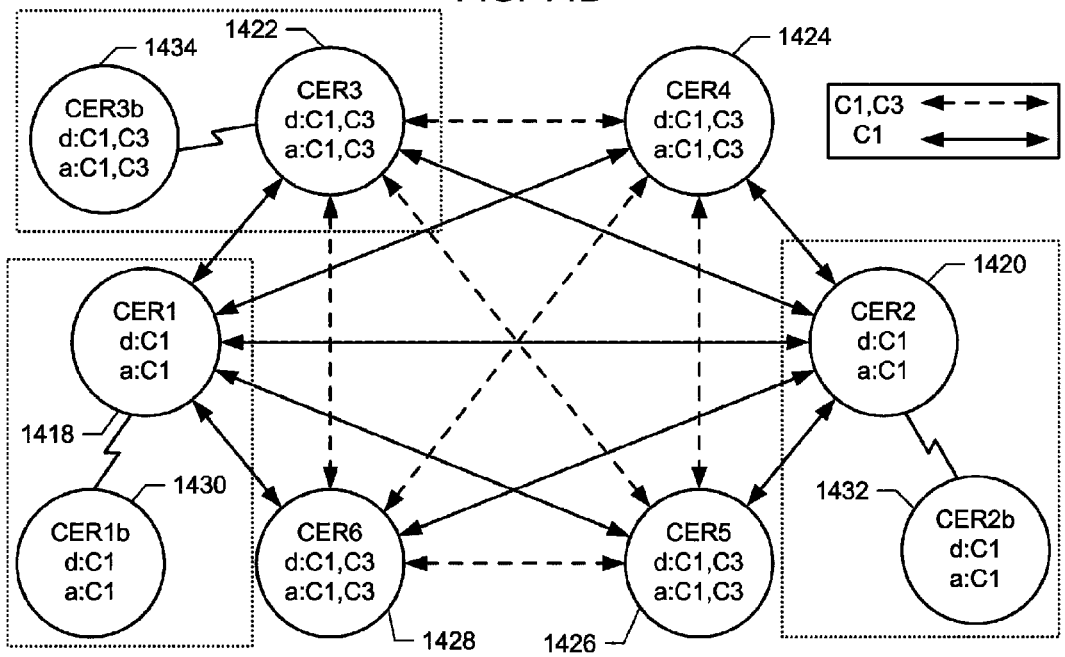

FIGS. 14A-14C illustrate CoS maps for example enterprise VPNs 1400, 1402, and 1404, respectively. The example CoS maps are generated by the example CoS mapper 1128 of FIG. 11 to provide a network operator with network-wide views of CoS and VPN designs. In the example VPNs 1400, 1402, and 1404, each node represents a CER and includes a set of classes configured at the CER (denoted d:), and a set of classes that may actually exit the router (denoted a:), taking shadowing into account. A link between nodes labeled "C1" indicates that the two corresponding CERs can communicate in a symmetric fashion using the C1 class of service. The ability for two CERs (e.g., CER1 and CER2) to communicate with each other is based on the address space of the two CERs.

FIG. 14A illustrates a CoS map for an example VPN 1400, which includes two CERs 1406 and 1408. For each of the CERs 1406 and 1408, policies corresponding to classes C1, C3, and C4 are defined in the configuration, but only traffic corresponding to class C1 may exit the CER 1406 or 1408 once shadowed policies are considered. The two CERs 1406 and 1408 have a link 1410 between them through which C1 traffic may be exchanged in either direction.

FIG. 14B illustrates a CoS map for another example VPN 1402, which includes three CERs 1412, 1414, and 1416. In the example VPN 1402, traffic corresponding to classes C2 and C3 may exit each router 1412-1416 (e.g., a: C2,C3), which is consistent with what is configured by the network operator (e.g., d: C2,C3). However, each router pair (e.g., CER1 1412-CER2 1414, CER2 1414-CER3 1416, CER1 1412-CER3 1416) may only exchange class C3 traffic, based on the address space of the CERs 1412-1416. Based on the CoS map, the VPN 1402 may be configured with shadowed policies and/or simply may not be using a class of service that is available to the VPN 1402.

FIG. 14C illustrates a CoS map for another example VPN 1404 that includes 9 routers 1418-1434 and is more complex than the VPNs 1400 and 1402. In the example VPN 1404, four of the routers (CER3 1422-CER6 1428) exchange traffic corresponding to classes C1 and C3 (dotted lines). Two of the other routers (CER1 1418 and CER2 1420) are exclusively configured with class C1, and can only exchange C1 traffic with other sites. An example inference that may be drawn about the example VPN 1404 from the corresponding CoS map is that the two sites corresponding to CER1 1418 and CER2 1420 correspond to voice call centers and, thus, only require voice traffic. In contrast, the sites corresponding to the CERs 1422-1428 may include both voice communication and data traffic.

Additionally, each of the routers CER1 1418 and CER2 1420, are each co-located with another router (i.e., CER1*b* 1430 and CER2*b* 1432). This corresponds to a primary-backup router arrangement in which each site has two CERs, with one configured as a primary, and another configured as a backup. The backup router (e.g., CER1*b* 1430 or CER2*b* 1432) does not normally see traffic, but may take over if the primary (e.g., CER1 1418 or CER2 1420) fails. A primary-backup arrangement is also used with CER3 1422. CER3 1422 also is configured with a default route back to itself. This may allow an inference that CER3 1422 is a gateway site, through which all traffic from the enterprise VPN 1406 to the Internet (e.g., the network backbone 140 of FIG. 1) is routed.

In some observed enterprise networks, examples of asymmetric classes may exist between router pairs (e.g., CER1 1418 and CER2 1420). For example, a pair of CERs may be able to communicate in C1 in one direction, but not in the reverse direction. When a pair of routers exchanges traffic having asymmetric classes, the example CoS mapper 1106 may draw two or more possible inferences: 1) streaming video traffic or certain other traffic types that are usually purely unidirectional may be transferred from one CER to another; and/or 2) the two sites represented by the CERs are not intended to exchange class C1 traffic in practice. The example model analyzer 142 may further include actual traffic data for the enterprise VPN to determine which, if any, of the inferences are correct and whether the CoS configuration is correct.

Returning to FIG. 11, the example pattern identifier 1108 detects whether application flows are treated in a correct and expected manner, and identifies any non-standard flow treatment that is a departure from best practice. In an example using collected enterprise VPN data, the pattern identifier 1108 determines departures from any of a series of established CoS configuration patterns. The example patterns captured expected consistency in treatment of flows in the marking, policing and queuing stages of the CERs and are inputs to the pattern identifier 1108.

In a first example pattern, the pattern identifier 1108 determines that flows marked as belonging to a data class by the marking stage are usually remarked by the policing stage as belonging to the same class, but also as either conformant or non-conformant. The pattern identifier 1108 notes a departure where a flow marked as belonging to a first data class (e.g., C1) is remarked by the policing stage as corresponding to a different data class (e.g., C2). Generally, marking standards include each CER marking the flow only once per CER and/or remarking traffic as conformant or non-conformant for the same data class as previously marked.

Departures from the first pattern may be due to a change in practices of router configuration and the corresponding treatment of legacy routers by network operators. Previous configuration practice was to configure marking policies at the input interfaces of routers. As underlying vendor capabilities have evolved, more recent configuration practice has become to configure marking policies in the output interfaces of routers. Legacy routers configured using the earlier approach are not typically modified unless an actual policy change was involved, in which case the policy changes are made on the output interfaces consistent with the newer practices. Departures from the first pattern then occur when the legacy configuration in the input interface is not eliminated.

In a second example pattern, the pattern identifier 1108 determines that flows that exit the policing stage marked as a particular data class (e.g., C1) go to the appropriate queue. A potential departure identified by the pattern identifier 1108 is a scenario where a flow does not go into any queue defined in the configuration and instead enters a default queue. As a result, the flow may receive non-deterministic and likely degraded treatment because the behavior with default queues is vendor and model-specific.

Service level agreement (SLA) probes are used to monitor network performance for each network class and ensure it is in compliance with the SLA. Some departures from the second pattern correspond to cases where traffic corresponding to SLA probes from some CERs is incorrectly queued. Although incorrect configuration of the SLA traffic does not impact the performance of the application, monitoring of the SLA results is affected. For example, if SLA probes are incorrectly queued into a default queue that is treated with lower priority than traffic corresponding to any of the data classes being monitored, the measurements of the SLA probes result in underestimation of the network performance.

In a third example pattern, the pattern identifier 1108 determines that flows that exit a CER are be explicitly marked by the CER. The pattern identifier 1108 identifies a departure as a concern since the treatment of the flow is not deterministic, and depends on how that flow was marked prior to entering the CER. In some examples, departures from the third pattern occur when flows that traverse a CER may not be marked at all by either the policing or the marking stages in the CER. Such a departure may occur, for example, when the service provider and the customer have an explicit agreement requiring the customer to mark traffic before it reaches the CER. While some service providers may cause the CERs to explicitly remark the traffic anyway, the net treatment seen by the flow would be identical regardless of a departure from the third pattern.

While the example methods and apparatus described above refer to the flow treatment by CERs and PERs, the example methods and apparatus may be modified to consider the core routers 132-138 of FIG. 1. However, CoS policies in core routers 132-138 are typically stable and relatively homogeneous. Enterprise-specific CoS designs are embedded in CERs, which tend to be heterogeneous in terms of CoS policies, and are much more complex.

While an example manner of implementing the VPN 100 has been illustrated in FIG. 1, one or more of the elements, processes and/or devices illustrated in FIG. 1 may be combined, divided, re-arranged, omitted, eliminated and/or implemented in any other way. Further, the example ruleset generator 702, the example ruleset flattener 704, the example ruleset composer 706, the example query analyzer 1102, the example shadowed policy detector 1104, the example CoS mapper 1106, the example pattern identifier 1108, the example path identifier 1120 and/or, more generally, the example CoS modeler 140 and/or the example model analyzer 142 of FIGS. 1, 7, and 11 may be implemented by hardware, software, firmware and/or any combination of hardware, software and/or firmware. Thus, for example, any of the example ruleset generator 702, the example ruleset flattener 704, the example ruleset composer 706, the example query analyzer 1102, the example shadowed policy detector 1104, the example CoS mapper 1106, the example pattern identifier 1108, the example path identifier 1120 and/or, more generally, the example CoS modeler 140 and/or the example model analyzer 142 could be implemented by one or more circuit(s), programmable processor(s), application specific integrated circuit(s) (ASIC(s)), programmable logic device(s) (PLD(s)) and/or field programmable logic device(s) (FPLD(s)), etc. When any of the appended apparatus claims are read to cover a purely software and/or firmware implementation, at least one of the example ruleset generator 702, the example ruleset flattener 704, the example ruleset composer 706, the example query analyzer 1102, the example shadowed policy detector 1104, the example CoS mapper 1106, the example pattern identifier 1108, and/or the example path identifier 1120 are hereby expressly defined to include a tangible storage medium such as a memory, DVD, CD, etc. storing the software and/or firmware. Further still, the example CoS modeler 140 and/or the example model analyzer 142 of FIGS. 1, 7, and 11 may include one or more elements, processes and/or devices in addition to, or instead of, those illustrated in FIGS. 1, 7, and 11, and/or may include more than one of any or all of the illustrated elements, processes and devices.

Figure 15:
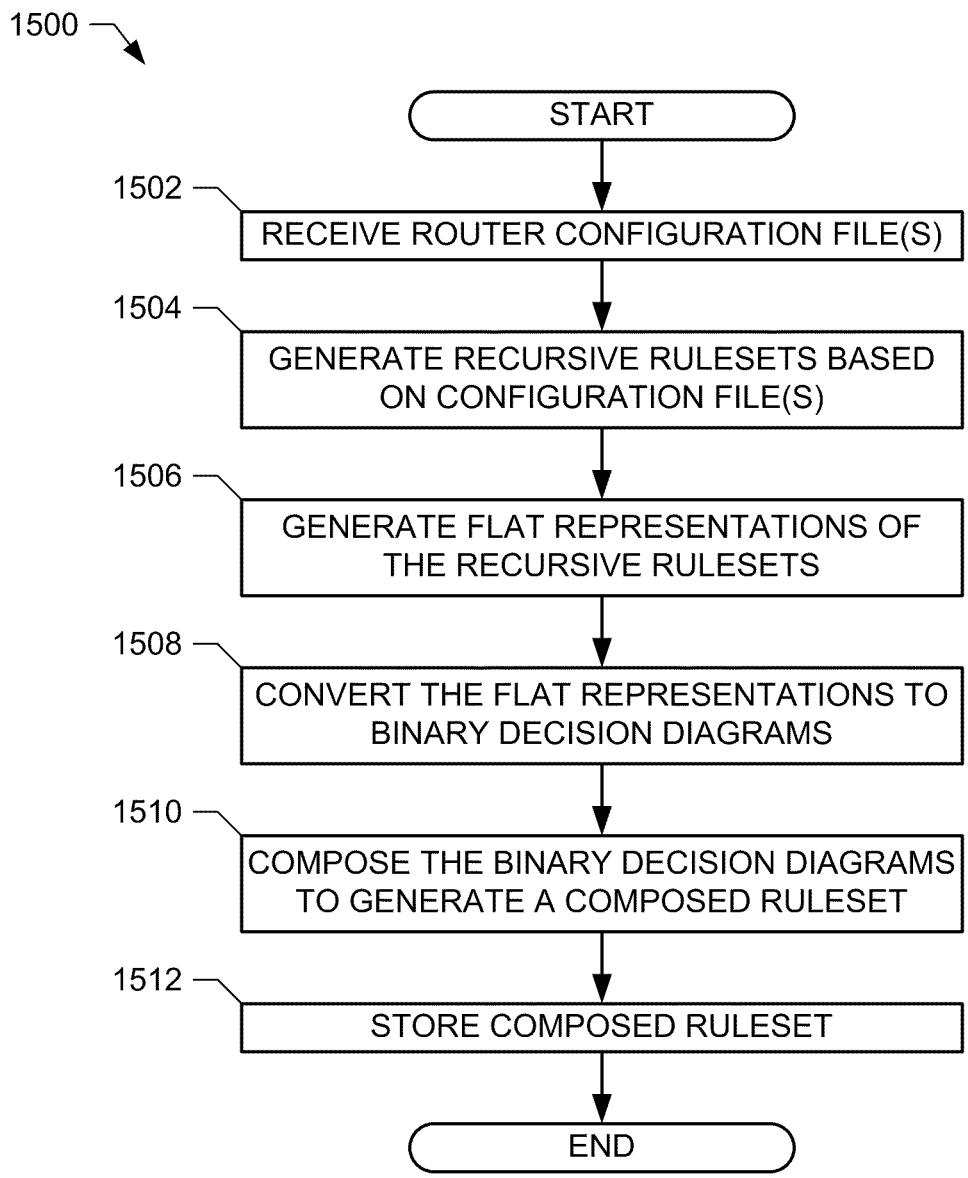
FIG. 15 is a flowchart representative of example machine readable instructions that may be executed to generate a class of service model.

FIG. 15 is a flowchart representative of example machine readable instructions 1500 that may be executed to generate a CoS model. The example instructions 1500 may be executed to implement the example CoS modeler 140 described in connection with FIGS. 1 and 7 to generate a CoS model 710. The example instructions 1500 begin by receiving (e.g., at the ruleset generator 702) one or more router configuration files including CoS policies (block 1502). The ruleset generator 702 generates recursive rulesets based on the received configuration files (block 1504).

The ruleset flattener 704 generates a flat representation of the recursive rulesets (block 1506). As described above, the flat representations provide an output action based on an input flow without nested rulesets. The ruleset flattener 704 further converts the flat representations to one or more BDDs (block 1508). The BDDs provide an efficient way to model and apply the CoS policies.

The ruleset composer 706 composes the BDDs generated by the ruleset flattener 704 to generate a composed ruleset (block 1510). Generally, composition of multiple rulesets results in a ruleset that behaves in the same way as the multiple rulesets from which is was composed, given the same input. The ruleset composer 706 then stores the composed ruleset(s) in, for example, a computer-readable memory or medium such as those described below with reference to FIG. 19.

Figure 16:
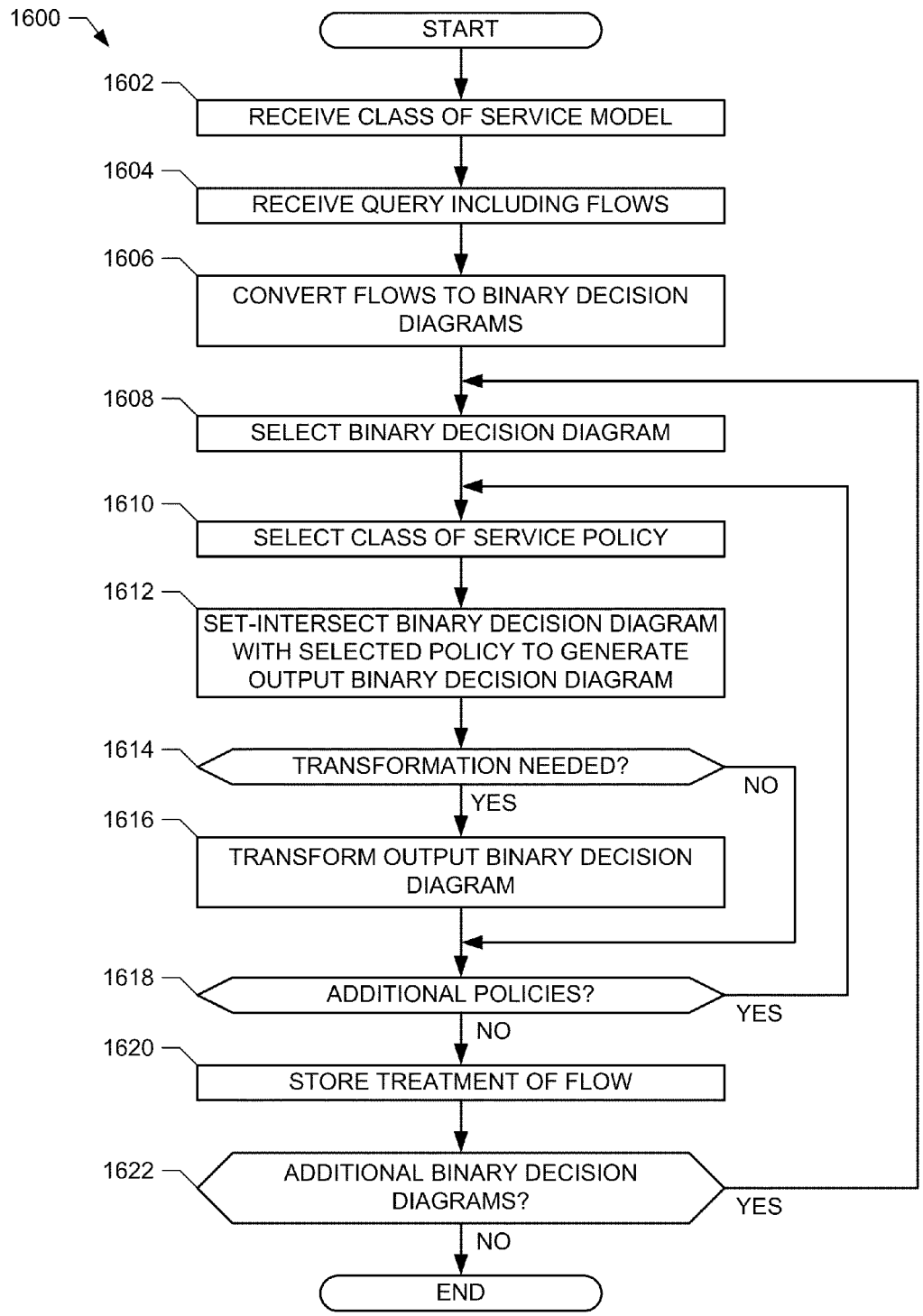
FIG. 16 is a flowchart representative of example machine readable instructions that may be executed to determine class of service treatment of one or more flows in a network.

FIG. 16 is a flowchart representative of example machine readable instructions 1600 that may be executed to determine CoS treatment of one or more flows in a network. The example instructions 1600 may be executed to implement the query analyzer 1102 of FIG. 11 to determine the treatment of one or more flows based on a CoS model (e.g., the CoS model 710 of FIG. 7).

The example instructions 1600 begin when the query analyzer 1102 receives a CoS model 710 (block 1602). The query analyzer 1102 further receives a query including one or more flows for which CoS treatment is to be determined (block 1604). The query analyzer 1102 converts the flows in the query to BDDs for more efficient analysis (block 1606).

The query analyzer 1102 selects a BDD for analysis (block 1608). The query analyzer 1102 selects the first policy that is to treat the BDD (e.g., a marking policy in a router) (block 1610). The BDD and the policy are set-intersected to generate an output BDD (e.g., representative of the treatment of the BDD by the policy) (block 1612). The query analyzer 1102 further determines whether a transformation of the output BDD is needed to ensure the correct treatment of the output BDD by additional policies (block 1614). For example, an output BDD may have a ToS byte that is to be transformed to ensure explicit treatment according to the ToS byte. If transformation is needed (block 1614), the example query analyzer 1102 transforms the output BDD accordingly (block 1616). An example of transformation is described above with reference to FIGS. 10A and 10B.

If transformation of the output BDD is not needed (block 1614), the query analyzer determines whether the output BDD is subject to additional CoS policies prior to reaching the destination (block 1618). If there are additional CoS policies (block 1618), control returns to block 1610 to select the next CoS policy. If there are no additional CoS policies (i.e., the output BDD has reached its destination) (block 1618), the query analyzer 1102 stores the treatment of the flow in, for example, a computer-readable memory or medium (block 1620). The query analyzer 1102 then determines whether there are additional BDDs for analysis (block 1622). If there are additional BDDs (block 1622), control returns to block 1608 to select another BDD. If there are no additional BDDs (block 1622), the example instructions 1600 may end. In some examples, a network operator or calling function may use the stored CoS treatments to evaluate network CoS performance or troubleshoot problems.

Figure 17:
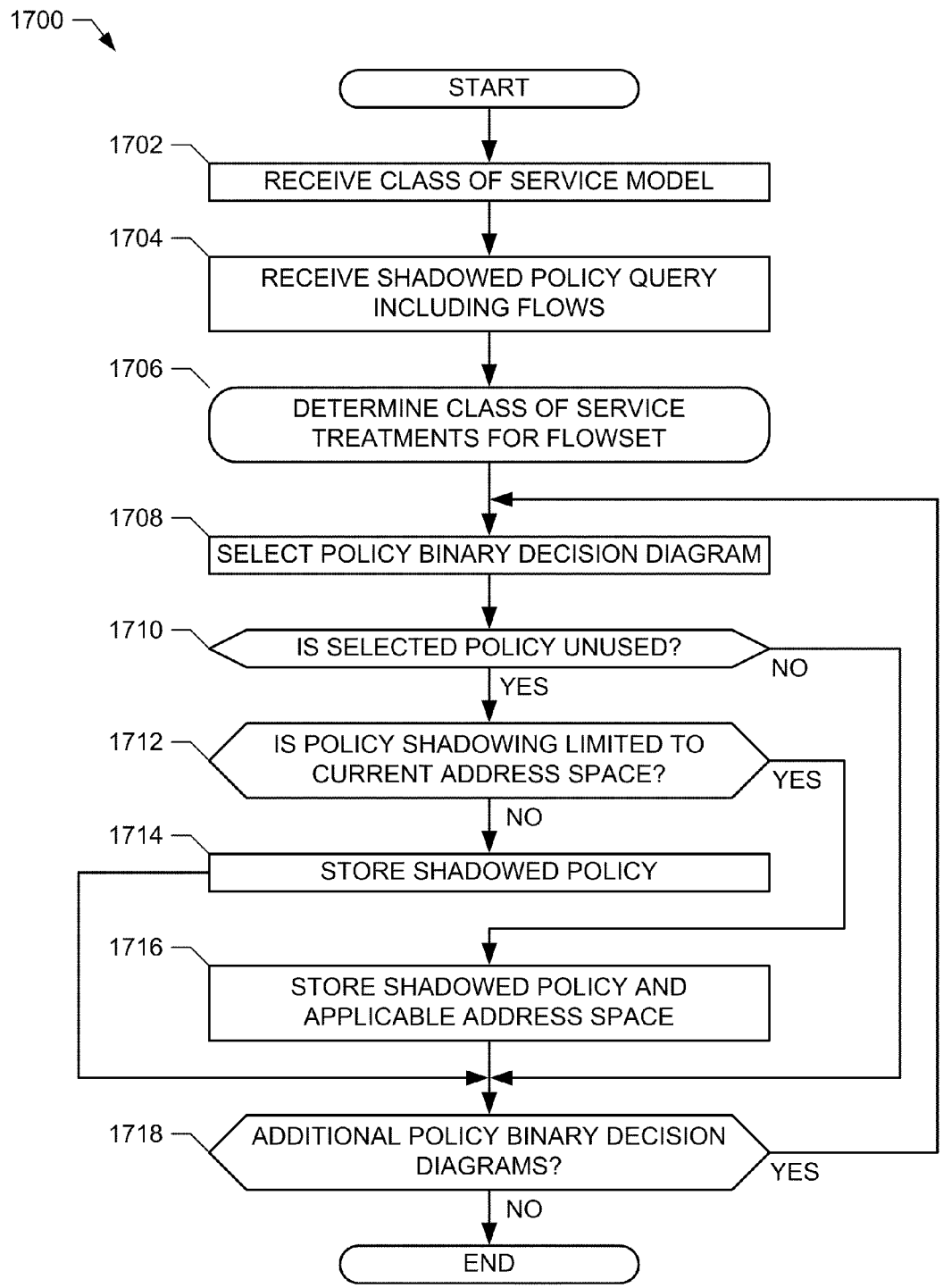
FIG. 17 is a flowchart representative of example machine readable instructions that may be executed to determine whether any shadowed class of service policies are configured in a network.

FIG. 17 is a flowchart representative of example machine readable instructions 1700 that may be executed to determine whether any shadowed CoS policies are configured in a network. The example instructions 1700 may be executed to implement the shadowed policy detector 1104 of FIG. 11 to determine whether any of the CoS policies in a network are shadowed policies 1126. The example instructions 1700 begin by receiving a CoS model 710 of a network (block 1706). The example shadowed policy detector 1104 also receives a shadowed policy query including applicable flows (block 1704).

The shadowed policy detector 1104 then determines the CoS treatments of for the flowset (block 1706). In some examples, the instructions 1700 may call the example instructions 1600 as a subroutine to determine the CoS treatments. When the CoS treatments have been determined, the shadowed policy detector 1104 selects a BDD corresponding to a policy (e.g., marking, policing, queuing) (block 1708). The shadowed policy detector 1104 determines whether the selected policy BDD is unused (block 1710). In some examples, unused policy BDDs are configured but are not applied because other policies have superseded the unused policy BDD for one or more applicable flows.

If the policy BDD is unused (block 1710), the shadowed policy detector 1104 determines whether the policy shadowing is limited to the current address space (block 1712). For example, if the policy BDD was tested in block 1706 for the universal flowset, the policy shadowing is not limited. If the policy shadowing is not limited to the current address space (block 1712), the example shadowed policy detector 1104 stores the shadowed policy in, for example, a computer-readable memory or medium (block 1714). However, if the policy shadowing is limited to the current address space (or other limitations), the shadowed policy detector 1104 stores the shadowed policy and the limitations on shadowing in, for example, a computer-readable memory or medium.

After storing the shadowed policy (block 1714 or 1716), or if the selected policy BDD is used (block 1710), the example shadowed policy detector 1104 determines whether any additional policy BDDs remain (block 1718). If there are additional policy BDDs (block 1718), control returns to block 1708 to select another policy BDD. If there are no additional policy BDDs (block 1718), the example instructions may end.

Figure 18:
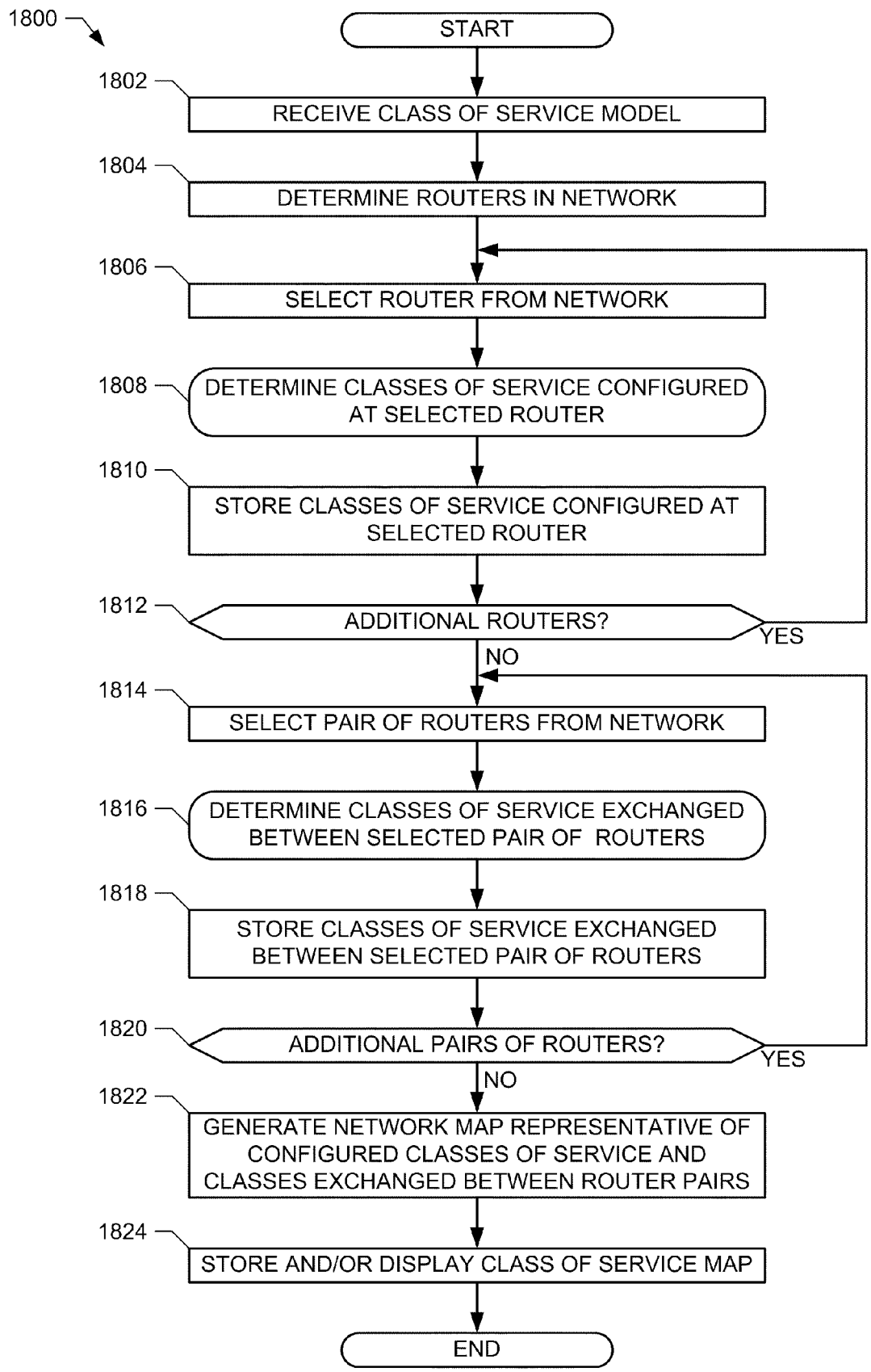
FIG. 18 is a flowchart representative of example machine readable instructions that may be executed to generate a class of service map for a network.

FIG. 18 is a flowchart representative of example machine readable instructions 1800 that may be executed to generate a CoS map for a network. The example instructions 1800 may be executed to implement the CoS mapper 1106 of FIG. 11 to generate a CoS map 1128 of a network. The example CoS mapper 1106 begins by receiving a CoS model 710 (block 1802). The CoS mapper 1106 further determines the routers in the network based on the CoS model (block 1804).

The CoS mapper 1106 continues by selecting a first router (e.g., a CER 112-120, a PER 122-128) from the routers in the network (block 1806). For the selected router, the CoS mapper 1106 determines the classes of service that are configured (block 1808). Block 1810 may be implemented by, for example, a subroutine call to the instructions 1600 of FIG. 16, where the input flows are specified to be flows having a source or destination IP address served by the selected router. The CoS mapper 1106 then stores the determined classes of service for the router in a computer-readable memory or medium (block 1810). The CoS mapper 1106 determines whether there are additional routers for which the configured classes of service are to be determined (block 1812). If there are additional routers (block 1812), control returns to block 1806 to select another router.

If there are no additional routers (block 1812), the CoS mapper 1106 selects a pair of the routers in the network (block 1814). It should be noted that each router may be included in multiple pairs, and any two routers that exchange traffic may be considered a pair. The example CoS mapper 1106 determines the classes of service that are exchanged between the selected pair of routers (block 1816). Block 1816 may be implemented by a subroutine call to the instructions 1600 of FIG. 16, where the input flows are flows between the selected pair of routers. The CoS mapper 1106 stores the classes of service that are exchanged between the selected pair of routers in, for example, a computer-readable memory or medium (block 1818). The example CoS mapper 1106 then determines whether any additional pairs of routers are left to be examined (block 1820). If there are additional pairs of routers (block 1820), control returns to block 1814 to select another pair of routers.

If there are no additional pairs of routers (block 1820), the CoS mapper 1106 generates a network map including configured classes of service and classes exchanged between router pairs (block 1822). Example CoS maps 1402, 1404, and 1406 are illustrated in FIGS. 14A, 14B, and 14C, respectively. The CoS mapper 1106 may then store the CoS map and/or display the CoS map to a network operator (block 1824). After storing and/or displaying the CoS map, the example instructions 1800 may end.

Figure 19:
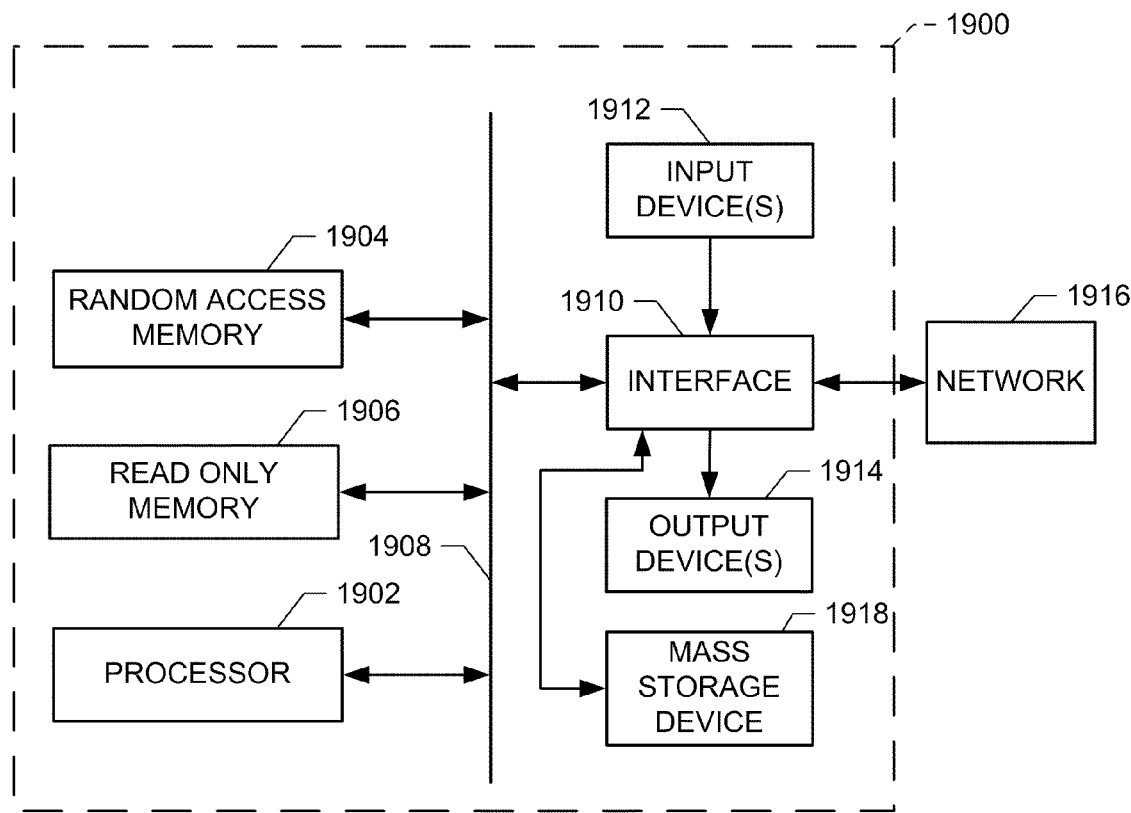
FIG. 19 is a block diagram of an example processing system that may execute the example machine readable instructions of FIGS. 15-18 to implement the example ruleset generator, the example ruleset flattener, the example ruleset composer, the example query analyzer, the example shadowed policy detector, the example CoS mapper, the example pattern identifier, the example path identifier, the example CoS modeler, the example model analyzer, and/or the example methods and apparatus described herein.

FIG. 19 is a block diagram of an example processing system 1900 that may execute example machine readable instructions to carry out the processes of FIGS. 15, 16, 17, and/or 18 to implement some or all of the example ruleset generator 702, the example ruleset flattener 704, the example ruleset composer 706, the example query analyzer 1102, the example shadowed policy detector 1104, the example CoS mapper 1106, the example pattern identifier 1108, the example path identifier 1120 and/or, more generally, the example CoS modeler 140 and/or the example model analyzer 142 of FIGS. 1, 7, and 11. The processing system 1900 can be, for example, a server, a personal computer, a personal digital assistant (PDA), an Internet appliance, a DVD player, a CD player, a digital video recorder, a personal video recorder, a set top box, a VoIP telephone, an analog telephony adapter, or any other type of computing device.

A processor 1902 is in communication with a main memory including a volatile memory 1904 and a non-volatile memory 1906 via a bus 1908. The volatile memory 1904 may be implemented by Synchronous Dynamic Random Access Memory (SDRAM), Dynamic Random Access Memory (DRAM), RAMBUS Dynamic Random Access Memory (RDRAM) and/or any other type of random access memory device. The non-volatile memory 1906 may be implemented by flash memory and/or any other desired type of memory device. Access to the main memory 1904, 1906 is controlled by a memory controller (not shown).

The processing system 1900 also includes an interface circuit 1910. The interface circuit 1910 may be implemented by any type of interface standard, such as an Ethernet interface, a universal serial bus (USB), and/or a third generation input/output (3GIO) interface.

One or more input devices 1912 are connected to the interface circuit 1910. The input device(s) 1912 permit a user to enter data and commands into the processor 1902. The input device(s) can be implemented by, for example, a keyboard, a mouse, a touchscreen, a track-pad, a trackball, isopoint and/or a voice recognition system.

One or more output devices 1914 are also connected to the interface circuit 1910. The output devices 1914 can be implemented, for example, by display devices, such as a liquid crystal display, a cathode ray tube display (CRT), a printer and/or speakers. The interface circuit 1910, thus, typically includes a graphics driver card.

The interface circuit 1910 also includes a communication device such as a modem or network interface card to facilitate exchange of data with external computers via a network 1916, such as an Ethernet connection, a digital subscriber line (DSL), a telephone line, coaxial cable, a cellular telephone system or any other network interface. The network 1916 may be implemented via the enterprise VPN 100 and/or the network 130 of FIG. 1.

The processing system 1900 also includes one or more mass storage devices 1918 for storing software and data. Examples of such mass storage devices 1918 include floppy disk drives, hard drive disks, compact disk drives and digital versatile disk (DVD) drives.

As an alternative to implementing the methods and/or apparatus described herein in a system such as the device of FIG. 19, the methods and/or apparatus described herein may alternatively be embedded in a structure such as processor and/or an ASIC (application specific integrated circuit).

At least some of the above described example methods and/or apparatus are implemented by one or more software and/or firmware programs running on a computer processor. However, dedicated hardware implementations including, but not limited to, application specific integrated circuits, programmable logic arrays and other hardware devices can likewise be constructed to implement some or all of the example methods and/or apparatus described herein, either in whole or in part. Furthermore, alternative software implementations including, but not limited to, distributed processing or component/object distributed processing, parallel processing, or virtual machine processing can also be constructed to implement the example methods and/or apparatus described herein.

It should also be noted that the example software and/or firmware implementations described herein may be stored on a tangible storage medium, such as: a magnetic medium, such as a magnetic disk or tape; a magneto-optical or optical medium such as an optical disk; or a solid state medium such as a memory card or other package that houses one or more read-only (non-volatile) memories, random access memories, or other re-writable (volatile) memories, or successor storage media to any of the above.

Although this patent discloses example systems including software or firmware executed on hardware, it should be noted that such systems are merely illustrative and should not be considered as limiting. For example, it is contemplated that any or all of these hardware and software components could be embodied exclusively in hardware, exclusively in software, exclusively in firmware or in some combination of hardware, firmware and/or software. Accordingly, while the above specification described example systems, methods and articles of manufacture, these examples are not the only way to implement such systems, methods and articles of manufacture. Therefore, although certain example methods, apparatus and articles of manufacture have been described herein, the scope of coverage of this patent is not limited thereto. On the contrary, this patent covers all methods, apparatus and articles of manufacture fairly falling within the scope of the appended claims either literally or under the doctrine of equivalents.

What is claimed is:

1. A method to generate a class of service model, comprising:
    electronically generating a ruleset based on a class of service configuration associated with a router;
    electronically generating a flat representation of the ruleset, wherein generating the flat representation comprises generating a binary decision diagram representative of the ruleset;
    electronically generating a class of service model by composing the flat representation into a composed ruleset, wherein composing the flat representation comprises transforming the binary decision diagram, wherein the binary decision diagram is a first binary decision diagram and transforming the first binary decision diagram comprises using existential quantification to remove a binary decision diagram variable from the binary decision diagram, generating a second binary decision diagram using the removed binary decision diagram variable, and performing a set-union on the first and second binary decision diagrams to generated a transformed binary decision diagram; and
    storing the class of service model in a computer-readable memory.

2. A method as defined in claim 1, further comprising generating a recursive representation of the ruleset.

3. A method as defined in claim 1, wherein the class of service configuration comprises a configuration file, the router providing a plurality of classes of service based on the configuration file.

4. A method as defined in claim 1, further comprising using the stored class of service model to do at least one of: output a flow treatment, identify a shadowed policy in the class of service model, identify a departure from a class of service configuration pattern, and electronically generate a class of service map of a virtual private network.

5. A method as defined in claim 1, wherein generating the flat representation further comprises set-intersecting a first binary decision diagram representative of a flowset with a second binary decision diagram representative of a router policy of the router.

6. A computer readable storage disk comprising machine readable instructions which, when executed, cause a machine to at least:
    generate a ruleset based on a class of service configuration associated with a router;
    generate a flat representation of the ruleset, wherein generating the flat representation comprises generating a binary decision diagram representative of the ruleset;
    generate a class of service model by composing the flat representation into a composed ruleset, wherein composing the flat representation comprises transforming the binary decision diagram, wherein the binary decision diagram is a first binary decision diagram, and transforming the first binary decision diagram comprises using existential quantification to remove a binary decision diagram variable from binary decision diagram, generating a second binary decision diagram using the removed binary decision diagram variable, and performing a set-union on the first and second binary decision diagrams to generated a transformed binary decision diagram; and
    store the class of service model in a computer-readable memory.

7. A computer readable storage disk as defined in claim 6, wherein the class of service configuration comprises a configuration file, the router providing a plurality of classes of service based on the configuration file.

8. A computer readable storage disk as defined in claim 7, wherein the instructions further cause the machine to use the stored class of service model to do at least one of: output a flow treatment, identify a shadowed policy in the class of service model, identify a departure from a class of service configuration pattern, and electronically generate a class of service map of a virtual private network.

9. A computer readable storage disk as defined in claim 6, wherein generating the flat representation further comprises set-intersecting a first binary decision diagram representative of a flowset with a second binary decision diagram representative of a router policy.

10. An apparatus, comprising:
    a processor; and
    a memory having computer readable instructions stored thereon which, when executed, cause the processor to perform operations comprising:
        generating a ruleset based on a class of service configuration associated with a router;
        generating a flat representation of the ruleset;
        generating a class of service model by composing the flat representation into a composed ruleset, wherein composing the flat representation comprises transforming the binary decision diagram, wherein the binary decision diagram is a first binary decision diagram, and transforming the first binary decision diagram comprises using existential quantification to remove a binary decision diagram variable from binary decision diagram, generating a second binary decision diagram using the removed binary decision diagram variable, and performing a set-union on the first and second binary decision diagrams to generated a transformed binary decision diagram; and storing the class of service model in the memory.

11. An apparatus as defined in claim 10, wherein generating the flat representation further comprises set-intersecting a first binary decision diagram representative of a flowset with a second binary decision diagram representative of a router policy.

12. An apparatus as defined in claim 10, wherein the instructions further cause the processor to generate a recursive representation of the ruleset.

13. An apparatus as defined in claim 10, wherein the class of service configuration comprises a configuration file, the router providing a plurality of classes of service based on the configuration file.

14. An apparatus as defined in claim 10, wherein the instructions further cause the processor to use the stored class of service model to do at least one of: output a flow treatment, identify a shadowed policy in the class of service model, identify a departure from a class of service configuration pattern, and electronically generate a class of service map of a virtual private network.

\* \* \* \* \*